United States Patent
Kadowaki

(10) Patent No.: US 7,440,630 B2
(45) Date of Patent: Oct. 21, 2008

(54) IMAGE COMPRESSING APPARATUS THAT ACHIEVES DESIRED CODE AMOUNT

(75) Inventor: Yukio Kadowaki, Nara (JP)

(73) Assignee: Ricoh Company, Ltd, Tokyo (JP)

( * ) Notice: Subject to any disclaimer, the term of this patent is extended or adjusted under 35 U.S.C. 154(b) by 573 days.

(21) Appl. No.: 10/550,264

(22) PCT Filed: Mar. 24, 2004

(86) PCT No.: PCT/JP2004/004047

§ 371 (c)(1),
(2), (4) Date: Sep. 22, 2005

(87) PCT Pub. No.: WO2004/088974

PCT Pub. Date: Oct. 14, 2004

(65) Prior Publication Data

US 2006/0177138 A1    Aug. 10, 2006

(30) Foreign Application Priority Data

Mar. 28, 2003    (JP)    .............................. 2003-090792

(51) Int. Cl.
G06K 9/36    (2006.01)
(52) U.S. Cl. .................................... 382/239
(58) Field of Classification Search ......... 382/232–233, 382/239–240, 248; 348/240, 240.018–240.19, 348/240.24–240.25; 375/384.1, 390.1, 395.1, 375/403.1–404.1, 408.1, 419.1–421.1, 424.2–425.1, 375/430.1–431.1
See application file for complete search history.

(56) References Cited

U.S. PATENT DOCUMENTS

2003/0081847 A1    5/2003    Sato
2006/0228028 A1    10/2006    Kadowaki

FOREIGN PATENT DOCUMENTS

| EP | 1158773 A2 | 11/2001 |
|---|---|---|
| EP | 1158774 A2 | 11/2001 |
| JP | 8-204970 | 8/1996 |
| JP | 2003-324612 | 11/2003 |
| JP | 2004-56605 | 2/2004 |
| WO | WO2004088973 | 10/2004 |

OTHER PUBLICATIONS

Aug. 23, 2007 Supplementary European search report corresponding to European patent application No. EP 04 72 3014.
"Adaptive rate control for JPEG2000 image coding in embedded systems", Takahiko Masuzaki et al., Graduate School of Informatics, Kyoto University, Kyoto, Japan.
"An overview of the JPEG 2000 still image compression standard", Majid Rabbani et al., Signal Processing: Image Communication 17 (2002) 3-48.
Ikurou Ueno et al. "Ouline of New International Standard For Coding of Still Image (JPEG2000)", Journal of the Institute of Image Information and Television Engineers, vol. 54, No. 2, pp. 164-171.

*Primary Examiner*—Jose L Couso
(74) *Attorney, Agent, or Firm*—Cooper & Dunham LLP

(57) ABSTRACT

An apparatus for compressing an image, comprising: a coding unit configured to generate code data by encoding data derived from image data; a memory unit which stores truncation data items identified by respective data sequence numbers, wherein a truncation data item specifies a way in which code data is removed from the generated code data, such that the larger the data sequence number, the higher a quality of a reproduced image obtained by decoding the generated code data after the removal of code data, or such that the larger the data sequence number, the lower the quality of the reproduced image; and a rate control unit configured to identify a data sequence number of a truncation data item that provides a code data parameter substantially equal to a desired value, said code data parameter being responsive to an amount of code data removal.

10 Claims, 18 Drawing Sheets

FIG.2

| DATA No. T | Y  3LL, 3HL-LH-HH, 2HL-LH-HH, 1HL-LH-HH<br>Cb 3LL, 3HL-LH-HH 2HL-LH-HH, 1HL-LH-HH<br>Cr 3LL, 3HL-LH-HH 2HL-LH-HH, 1HL-LH-HH | DATA No. T | Y  3LL, 3HL-LH-HH, 2HL-LH-HH, 1HL-LH-HH<br>Cb 3LL, 3HL-LH-HH 2HL-LH-HH, 1HL-LH-HH<br>Cr 3LL, 3HL-LH-HH 2HL-LH-HH, 1HL-LH-HH |
|---|---|---|---|
| T=0 | 0, 0 0 0, 0 0 0, 0 0 0<br>0, 0 0 0, 0 0 0, 0 0 1<br>0, 0 0 0, 0 0 0, 0 0 0 | T=399 | 1, 1 1 3, 4 4 6, 101017<br>9, 101013, 141418, 202027<br>8, 9 911, 121216, 181823 |
| T=1 | 0, 0 0 0, 0 0 0, 0 0 0<br>0, 0 0 0, 0 0 0, 0 0 2<br>0, 0 0 0, 0 0 0, 0 0 0 | T=400 | 1, 1 1 3, 4 4 6, 101017<br>9, 101013, 141418, 202027<br>8, 9 911, 121216, 181823 |
| T=2 | 0, 0 0 0, 0 0 0, 0 0 0<br>0, 0 0 0, 0 0 0, 0 0 3<br>0, 0 0 0, 0 0 0, 0 0 0 | ⋮ | |
| ⋮ | ⋮ | T=499 | |
| T=99 | 0, 0 0 0, 0 0 0, 0 0 6<br>0, 0 0 3, 4 4 8, 101017<br>0, 0 0 1, 2 2 6, 7 713 | T=500 | |
| T=100 | 0, 0 0 0, 0 0 0, 0 0 7<br>0, 0 0 3, 4 4 8, 101017<br>0, 0 0 1, 2 2 6, 7 713 | ⋮ | |
| ⋮ | ⋮ | T=1000 | |
| T=199 | 0, 0 0 0, 0 0 0, 5 511<br>3, 4 4 7, 8 813, 151521<br>2, 3 3 6, 7 710, 121217 | ⋮ | |
| T=200 | 0, 0 0 0, 0 0 0, 5 511<br>3, 4 4 7, 8 813, 151522<br>2, 3 3 6, 7 710, 121217 | T=1500 | |
| ⋮ | ⋮ | ⋮ | |
| T=299 | 0, 0 0 0, 1 1 4, 8 814<br>6, 7 710, 111216, 181825<br>6, 6 6 9, 101013, 151520 | ⋮ | |
| T=300 | 0, 0 0 0, 1 1 4, 8 814<br>6, 7 710, 121216, 181825<br>6, 6 6 9, 101013, 151520 | ⋮ | |
| ⋮ | ⋮ | | |

FIG.15

| DATA INDICATIVE OF AMOUNT OF CODE-DATA REMOVAL | Label |
|---|---|
| | ADD3LL |
| | ADD3HL |
| | ADD3LH |
| | ADD3HH |
| | ADD2HL |
| | ADD2LH |
| | ADD2HH |
| | ADD1HL |
| | ADD1LH |
| | ADD1HH |

| Data | Address |
|---|---|
| $D_0$ | ADD2HH |
| $D_1$ | ADD2HH+ADD$_{OFF}$ |
| $D_2$ | ADD2HH+2ADD$_{OFF}$ |
| $D_3$ | ADD2HH+3ADD$_{OFF}$ |
| $D_4$ | ADD2HH+4ADD$_{OFF}$ |
| $D_5$ | ADD2HH+5ADD$_{OFF}$ |
| $D_6$ | ADD2HH+6ADD$_{OFF}$ |
| ⋮ | |
| $D_{41}$ | ADD2HH+41ADD$_{OFF}$ |
| $D_{42}$ | ADD2HH+42ADD$_{OFF}$ |
| $D_{43}$ | ADD2HH+43ADD$_{OFF}$ |
| $D_{44}$ | ADD2HH+44ADD$_{OFF}$ |
| $D_{45}$ | ADD2HH+45ADD$_{OFF}$ |
| $D_{46}$ | ADD2HH+46ADD$_{OFF}$ |

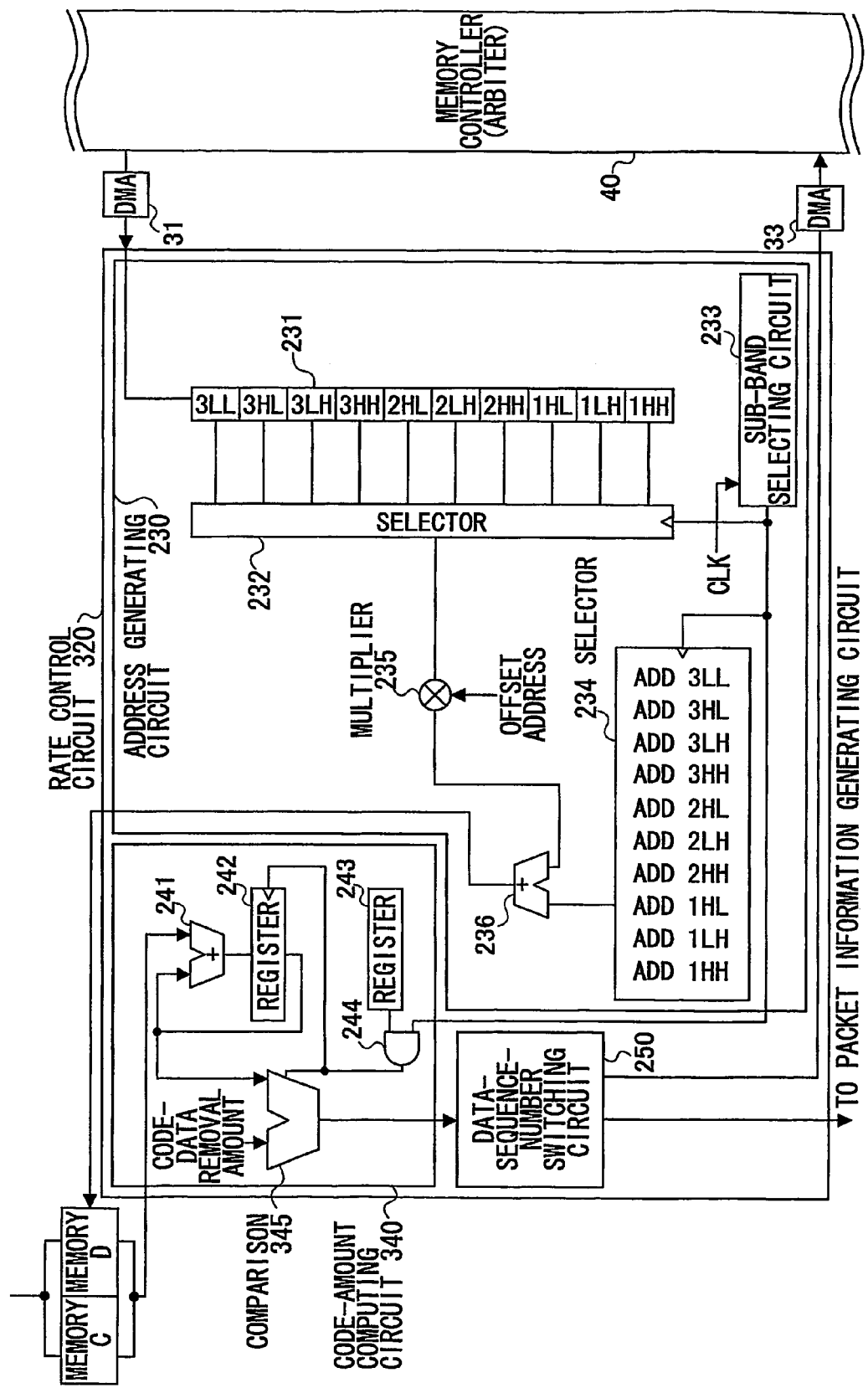

IMAGE COMPRESSING APPARATUS THAT ACHIEVES DESIRED CODE AMOUNT

TECHNICAL FIELD

The invention generally relates to an image compressing apparatus, and particularly relates to an image compressing apparatus which performs compression coding of image data by complying with JPEG2000 or the like.

BACKGROUND ART

JEPG2000 is known these days as a compression coding method that is suitable for high definition images. In coding according to JPEG2000, image data is converted into data of respective color components Y, Cb, and Cr, followed by 2-dimensional discrete wavelet transform performed on the data for the purpose of frequency analysis. Wavelet coefficient data (e.g., 16-bit data) obtained by the wavelet transform is then divided into bitplanes independently with respect to each sub-band (e.g., 3LL, 3HL, 3LH, 3HH, 2HL, 2LH, 2HH, 1HL, 1LH, and 1HH in the case of level-3 wavelet transform). The data of each bitplane is scanned in a descending order of planes on a sub-band-by-sub-band basis by use of three different methods, thereby performing arithmetic coding. The three methods are referred to as a significant propagation pass, a magnitude refinement pass, and a cleanup pass.

Compression of code data is performed by uniformly removing code data, successively in an ascending order of planes starting from the lowest-order bitplane, with respect to the coding passes in all the code-blocks of each sub-band that are obtained by the three different scanning methods. This is referred to as truncation. Here, the removal of code data refers to the replacement with "0" (invalid data) of a bit that needs to be removed. Coding according to JPEG2000 is described in detail in "Outline of New International Standard System for Still Image Coding (JPEG200)", Journal of Institute of Image Information and Television Engineers 2000, Vol. 54, No. 2, pp. 164-171.

In coding according to JPEG2000, code data is successively removed from the coding passes in an ascending order of bitplanes starting from the lowest-order bitplane in each sub-band, thereby performing data compression that easily achieves a desired amount of code data (which may simply be referred to as "code amount"). Depending on the way the data is removed, however, a reproduced image obtained after decoding of the code data may suffer significant degradation of image quality.

In the JPEG2000 standard, code data after data removal is decoded with respect to each bit plane, and distortion is computed by comparing the reproduced image with an original image prior to the data removal, thereby identifying the way the data is removed that minimizes the computed distortion. In this method, however, complex computation is required to be preformed many times, resulting in a lengthy processing time. This also gives rise to a problem in that hardware implementation is extremely difficult.

Accordingly, there is a need for an image compressing apparatus which compresses image data into a desired code amount at high speed with a simple construction while maintaining the quality of a reproduced image as much as possible.

DISCLOSURE OF INVENTION

It is a general object of the present invention to provide an image compressing apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image compressing apparatus particularly pointed out in the specification in such full, clear, concise, and exact terms as to enable a person having ordinary skill in the art to practice the invention.

To achieve these and other advantages in accordance with the purpose of the invention, the invention provides an apparatus for compressing an image including a coding unit configured to generate code data by encoding data derived from image data, a memory unit which stores truncation data items identified by respective data sequence numbers, wherein a truncation data item specifies a way in which code data is removed from the generated code data, such that the larger the data sequence number, the larger an amount of code data removal, or such that the larger the data sequence number, the smaller the amount of code data removal, and a rate control unit configured to identify a data sequence number of a truncation data item that provides a code data parameter substantially equal to a desired value, the code data parameter being responsive to the amount of code data removal.

According to another aspect of the invention, the rate control unit includes a computing unit configured to compute the code data parameter according to a truncation data item of a specified data sequence number, and a data-sequence-number switching unit configured to change the specified data sequence number in response to comparison of the computed code data parameter with the desired value, thereby identifying the data sequence number of the truncation data item that provides the code data parameter substantially equal to the desired value.

According to another aspect of the invention, the coding unit generates the code data for respective units of processing, and the removal of code data according to a truncation data item is independent in each of the units of processing.

According to another aspect of the invention, the code data parameter is equal to a total amount of code-data removal in all the units of processing, the apparatus further includes a data-processing unit configured to compute amounts of code-data removal in the respective units of processing and to store the computed amounts of code-data removal in memory, wherein the computing unit computes the code data parameter based on the computed amounts stored in the memory.

According to another aspect of the invention, the generated code data in a given one of the units of processing is comprised of bitplanes, and the data-processing unit is further configured to compute amounts of code-data removal with respect to removal of respective bitplanes in the given one of the units of processing.

According to another aspect of the invention, the generated code data in a given one of the units of processing is comprised of bitplanes, and the data-processing unit is further configured to compute amounts of code-data removal with respect to removal of respective numbers of bitplanes in the given one of the units of processing.

According to another aspect of the invention, the code data parameter is equal to a total amount of code data remaining after the code-data removal in all the units of processing, the apparatus further includes a data-processing unit configured to compute amounts of code data remaining after the code-data removal in the respective units of processing and to store the computed amounts in memory, wherein the computing unit computes the code data parameter based on the computed amounts stored in the memory.

According to another aspect of the invention, the generated code data in a given one of the units of processing is comprised of bitplanes, and the data-processing unit is further configured to compute amounts of remaining code data with respect to removal of respective numbers of bitplanes in the given one of the units of processing.

According to another aspect of the invention, the coding unit performs two-dimensional discrete wavelet transform so as to generate the code data for, respective sub-bands, the removal of code data according to a truncation data item being independent in each of the sub-bands and being directed to one or more bits on a side of a lowest-order bit in each of the sub-bands.

According to another aspect of the invention, an apparatus for compressing an image includes a coding unit configured to generate code data by encoding data derived from image data, a memory unit which stores truncation data items identified by respective data sequence numbers, wherein a truncation data item specifies a way in which code data is removed from the generated code data, such that the larger the data sequence number, the higher a quality of a reproduced image obtained by decoding the generated code data after the removal of code data, or such that the larger the data sequence number, the lower the quality of the reproduced image, and a rate control unit configured to identify a data sequence number of a truncation data item that provides a code data parameter substantially equal to a desired value, the code data parameter being responsive to an amount of code data removal.

In the apparatus for compressing an image described above, truncation data is provided such that the amount of code data removal increases (or decreases) with increasing (or decreasing) degradation of image quality as the data sequence number increases. This provision provides an advantage in that there is no need to decode the codes after truncation according to the JPEG2000 standard for comparison with an image prior to the truncation and to identify proper truncation that minimizes distortion. With the present invention, it is easy to adjust a code amount by changing the data sequence number in response to comparison of the code data parameter with the desired value.

Further, the data sequence number is changed in accordance with a difference between the desired value and the code data parameter obtained from a specified truncation data item, thereby providing for easy and rapid adjustment of a code amount.

Other objects and further features of the present invention will be apparent from the following detailed description when read in conjunction with the accompanying drawings.

BRIEF DESCRIPTION OF DRAWINGS

FIG. 2 is a drawing showing a truncation table.

FIG. 15 is an illustrative drawing showing a memory map of a memory C or a memory D of the image compressing apparatus of FIG. 13.

FIG. 19 is a circuit diagram showing the construction of a rate control circuit of the image compressing apparatus of the third embodiment.

BEST MODE FOR CARRYING OUT THE INVENTION

In the following, image compressing apparatuses according to embodiments of the invention will be described with reference to the accompanying drawings.

(1) FIRST EMBODIMENT (1-1) Outline of Data Removal

Figure 1:
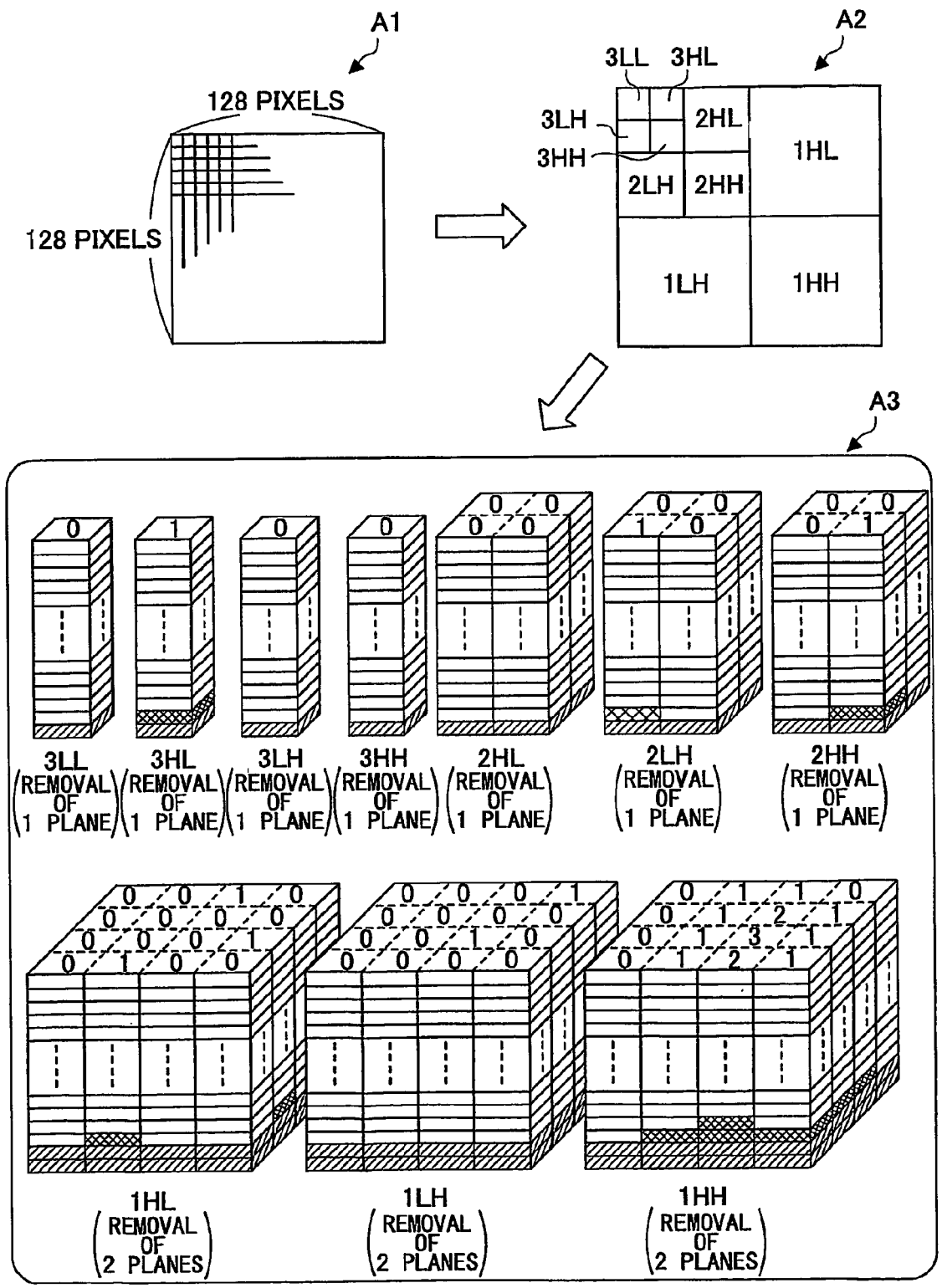
FIG. 1 is an illustrative drawing for explaining the removal of code data that is performed by an image compressing apparatus according to a first embodiment.

FIG. 1 is an illustrative drawing for explaining the removal of code data that is performed by an image compressing apparatus 100 (see FIG. 3) according to the first embodiment. An example to be examined here is a case in which image data having 128×128 pixels as indicated by an arrow A1 is encoded. First, the image data is converted into data of three color components Y, Cb, and Cr. Since each color component data is processed in the same manner, a description will be given only with respect to the processing of Y component data. Two-dimensional discrete wavelet transform is performed on the Y component data for the purpose of frequency analysis, producing 16-bit wavelet coefficients for sub-bands as indicated by an arrow A2 (i.e., 3LL, 3HL, 3LH, 3HH, 2HL, 2LH, 2HH, 1HL, 1LH, and 1HH). The wavelet coefficients are grouped into the respective sub-bands, and are further divided into 16 bitplanes. The wavelet coefficients of the 16 bitplanes in each sub-band are scanned and subjected to arithmetic coding by the three different methods in a descending order of bits. The three methods are referred to as a significant propagation pass, a magnitude refinement pass, and a clean up pass. The arithmetic coding generates code data comprised of 46 planes of coding passes in each sub-band, as indicated by an arrow A3.

The image compressing apparatus 100 according to the first embodiment successively removes (truncates) the code data of the coding passes in each sub-band in an ascending order starting from the lowest-order bitplane. There are two methods of doing so as follows.

A description will be given of the first method of removing code data. FIG. 2 is a drawing showing a truncation table. As shown in FIG. 2, the truncation table is comprised of more than 1500 data items, which define how many code data are removed in an ascending order of bitplanes starting from the lowest-order bitplane in each coding pass, on a sub-band-by-sub-band basis (i.e., 3LL, 3HL, 3LH, 3LL, 2HL, 2LH, 2LL, 1HL, 1LH, and 1LL), independently with respect to each color component Y, Cb, and Cr. Such data items are hereinafter referred to as truncation data.

For example, truncation data may be defined as 1, 111, 111, and 222. As indicated by hatches in FIG. 1, such truncation data defines the number of planes removed successively by starting from the lowest-order bitplane with respect to the code data of coding passes in all the code blocks of each sub-band where each sub-band is the unit of processing for arithmetic coding. In this example, one plane is removed in 3LL, one plane in each of level-3 HL, LH, and HH, one plane in each of level-2 HL, LH, and HH, and two planes in each of level-1 HL, LH, and HH.

The truncation data shown in FIG. 2 is configured such that, as the data sequence number increases, the number of removed code data (i.e., code amount) increases and the quality of a reproduced image degrades in an increasing degree. Alternatively, the truncation data may be configured such that, as the data sequence number increases, the removed code amount decreases and the quality of a reproduced image improves in an increasing degree. Difference in processing will be described later at relevant places.

Each truncation data is created based on experiments using sample images or based on the statistics of results obtained from experiments using various sample images. It should be noted here that a plurality of tables may be provided, and tables may be switched depending on the amount of a shift that an object shows between adjacent frames when moving pictures are taken.

Figure 3:
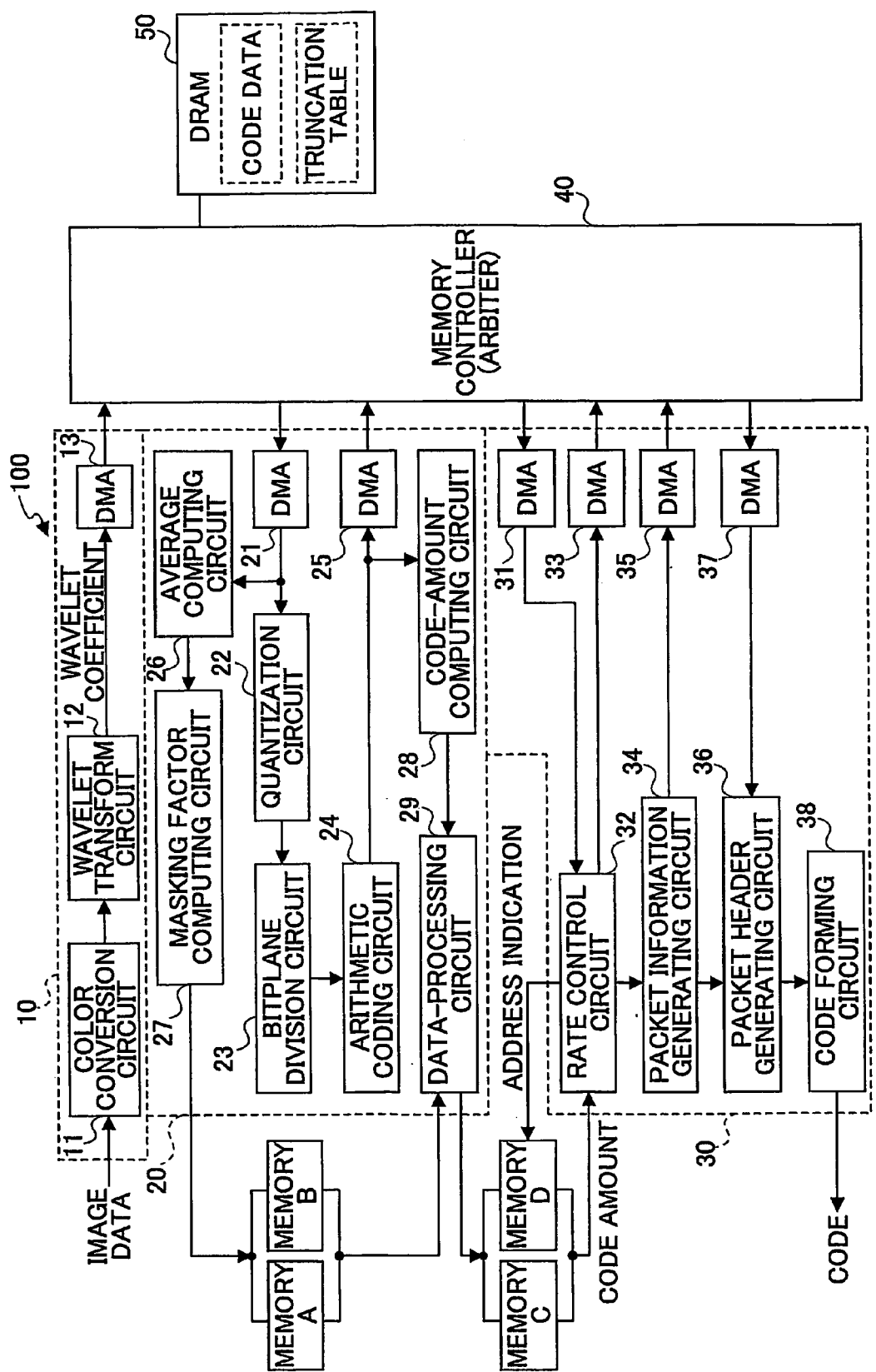
FIG. 3 is a block diagram showing a construction of the image compressing apparatus according to the first embodiment.

In the image compressing apparatus 100 according to the first embodiment, a memory (corresponds to a memory A and a memory B in FIG. 3)

stores a code amount of each coding pass that is obtained after the arithmetic coding of the 16 bitplanes of each sub-band. Based on the code amount stored in the memory, a removed amount of code data (which may simply be referred to as a code removal amount) is then obtained, followed by computing a difference between the obtained amount and a desired code removal amount. If the removed amount of code data is small and fails to reach the desired code removal amount, truncation data of a larger sequence number corresponding to a larger data removal amount is selected. On the other hand, if the removed amount of code data is large and exceeds the desired code removal amount, truncation data of a smaller sequence number corresponding to a smaller data removal amount is selected.

In the compression of code data according to the first method described above, truncation data is provided such that a code removal amount increases and image quality degrades as the data sequence number increases. This provision provides an advantage in that there is no need to decode the codes after truncation according to the JPEG2000 standard for comparison with an image prior to the truncation and to identify proper truncation that minimizes distortion.

In the first method described above, a predetermined number of code-data planes are uniformly removed across the board from coding passes in each sub-band as determined by the truncation table on a sub-band-specific basis. According to a second method of data removal, each sub-band is further divided into code-blocks serving as another unit of processing, and the number of removed coding-pass planes is increased according to the size of wavelet coefficients in each code-block. A change in the amount of data removal between code-blocks in the same sub-band may create a distortion appearing in a reproduced image on code-block borders. In consideration of this, it is a general practice to perform the removal of code data on a sub-band-by-sub-band basis. The second method described above, however, draws on the fact that human visual perception produces a sense of gradual quality degradation in a reproduced image and may not detect distortion when a significant amount of data removal is done in a portion having a large amount of image components in a sub-band. In this manner, a compression rate is improved while maintaining the quality of a reproduced image at a high level, compared with a case in which code data is uniformly removed in each sub-band that serves as a normal unit of processing.

More specifically, the number (0-2) of planes of coding passes that are to be removed is determined according to an average of the wavelet coefficients of effective pixels on a code-block-by-code-block basis in each sub-band. In each sub-band indicated by the arrow A3, code-blocks are shown as partitioned by dotted lines, and the number of masks (i.e., the number of additional coding-pass planes that are to be removed) is shown on the top of each code block. A corresponding coding-pass plane is indicated by cross hatching. In this manner, the number of coding-pass planes that are to be removed is adjusted independently for each code-block, thereby achieving more efficient code-data removal while avoiding degradation in the quality of reproduced images.

(1-2) Construction of Image Compressing Apparatus

FIG. 3 is a block diagram showing a construction of the image compressing apparatus 100 according to the first embodiment. The image compressing apparatus 100 includes a wavelet transform unit 10, an arithmetic coding unit 20, a packet header generating unit 30, a memory controller 40, and a DRAM 50. The memory controller 40 is an arbiter circuit, and arbitrates the right to access data between DMA 13, 21, 25, 31, 33, 35, and 37 of the wavelet transform unit 10, the arithmetic coding unit 20, and the packet header generating unit 30 as they attempt to access the DRAM 50. The DRAM 50 stores the data of the truncation table shown in FIG. 2, and also works as a storage for code data of all the sub-bands of a processed frame image.

In the following, the construction and operation of the wavelet transform unit 10, the arithmetic coding unit 20, and the packet header generating unit 30 will be described in detail with reference to FIG. 4 through FIG. 12 as appropriate.

(1-2-1) Wavelet Transform Unit

The wavelet transform unit 10 converts image data into 16-bit wavelet coefficients. A color conversion circuit 11 converts incoming image data into color components Y, Cb, and Cr for outputting. The wavelet transform circuit 12 performs 2-dimensional discrete wavelet transform on the data of each color component after the color conversion. The DMA 13 stores obtained wavelet coefficients in the DRAM 50 at predetermined addresses. Here, the color conversion circuit 11 and the wavelet transform circuit 12 may be conventional circuits.

(1-2-2) Arithmetic Coding Unit

The arithmetic coding unit 20 performs arithmetic coding on the wavelet coefficients that are stored in the DRAM 50 by the wavelet transform unit 10, and stores code data of each coding pass of each sub-band in the DRAM 50. The arithmetic coding unit 20 identifies the amount of masking (i.e., the number of coding-pass planes) separately for each code-block in each sub-band, and stores the identified mask amount in the memory A or memory B.

Furthermore, based on the mask amount and the code amount in each coding pass of each code-block, the amount of codes that is to be removed when one plane is removed from each of the coding passes in each sub-band based on the truncation data is identified, and is stored in a memory C or memory D. Here, the above-mentioned code amount is an amount after additional code data removal is performed according to the mask amount in each code-block.

The DMA 21 reads the wavelet coefficients stored at the predetermined addresses of the DRAM 50 on a per-sub-band basis. A quantization circuit 22 performs entropy quantization on the retrieved 16-bit wavelet coefficients, which are then input into a bitplane division circuit 23 for division into 16 bitplanes. An arithmetic coding circuit 24 scans data of the bitplanes in a descending order of bits and performs arithmetic coding independently for each sub-band according to the three different methods (i.e., coding passes). The three methods are the significant propagation pass, the magnitude refinement pass, and the cleanup pass. The code data output from the arithmetic coding circuit 24 is comprised of 46 (=15×3+1) planes of coding-pass code data, and is stored in the DRAM 50 through the DMA 25. Here, the quantization circuit 22, the bitplane division circuit 23, and the arithmetic coding circuit 24 may be conventional circuits.

Figure 4:
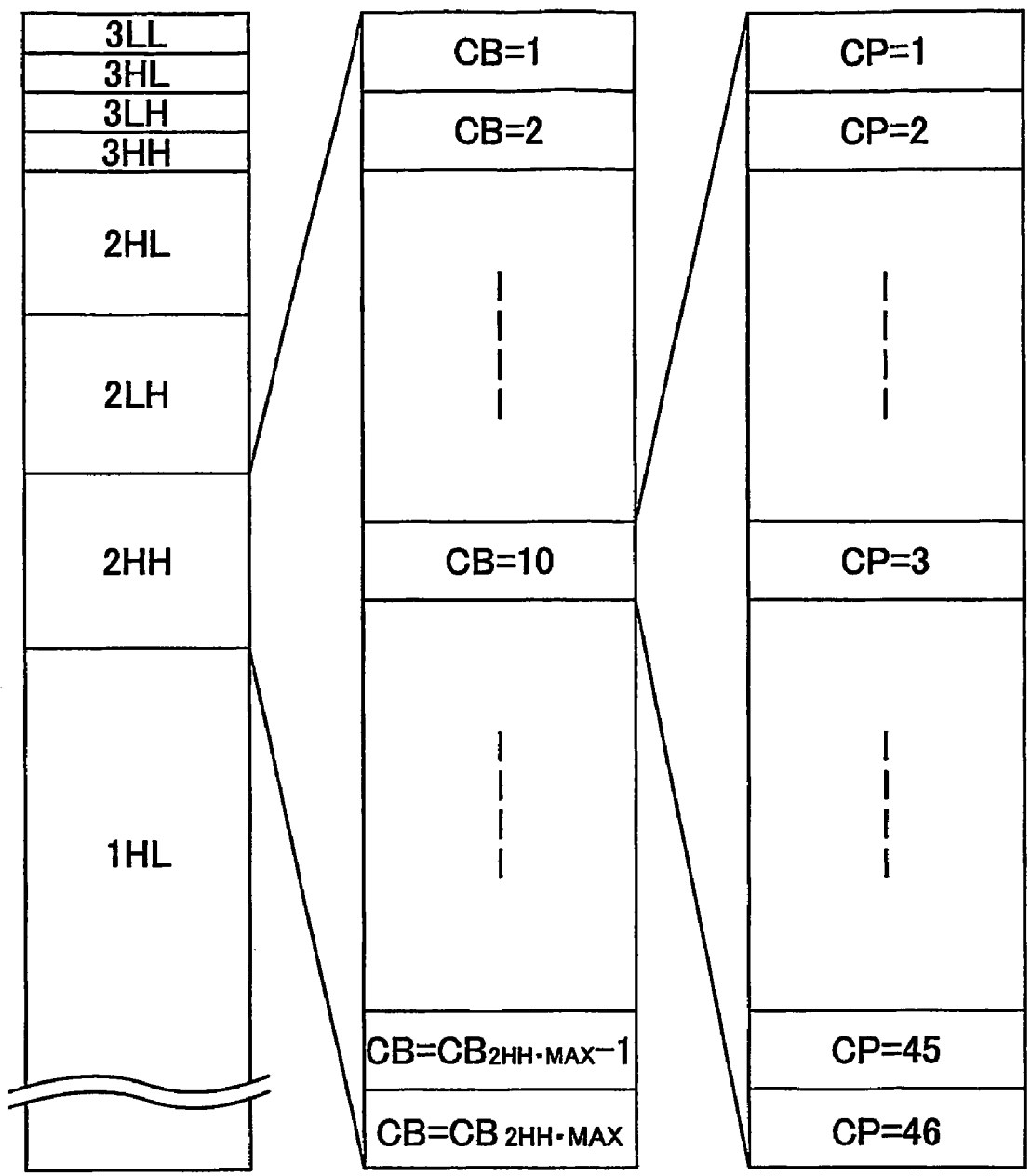
FIG. 4 is an illustrative drawing showing a memory map of code data inside a DRAM.

FIG. 4 is an illustrative drawing showing a memory map of code data inside the DRAM 50. Code data is stored in the order of 3LL, 3HL, 3LH, 3HH, 2HL, 2LH, 2HH, 1HL, 1LH, and 1HH. In the 2HH sub-band, for example, 46 planes of coding-pass code data are stored in an ascending order of code-block sequence numbers, which are assigned to the code-blocks according to predetermined rules. Such order is 1, 2, . . . , 10, . . . $CB_{2HH\cdot MAX}$ ($CB_{2HH\cdot MAX}$ represents the largest number assigned to a code-block in 2HH).

Figure 5:
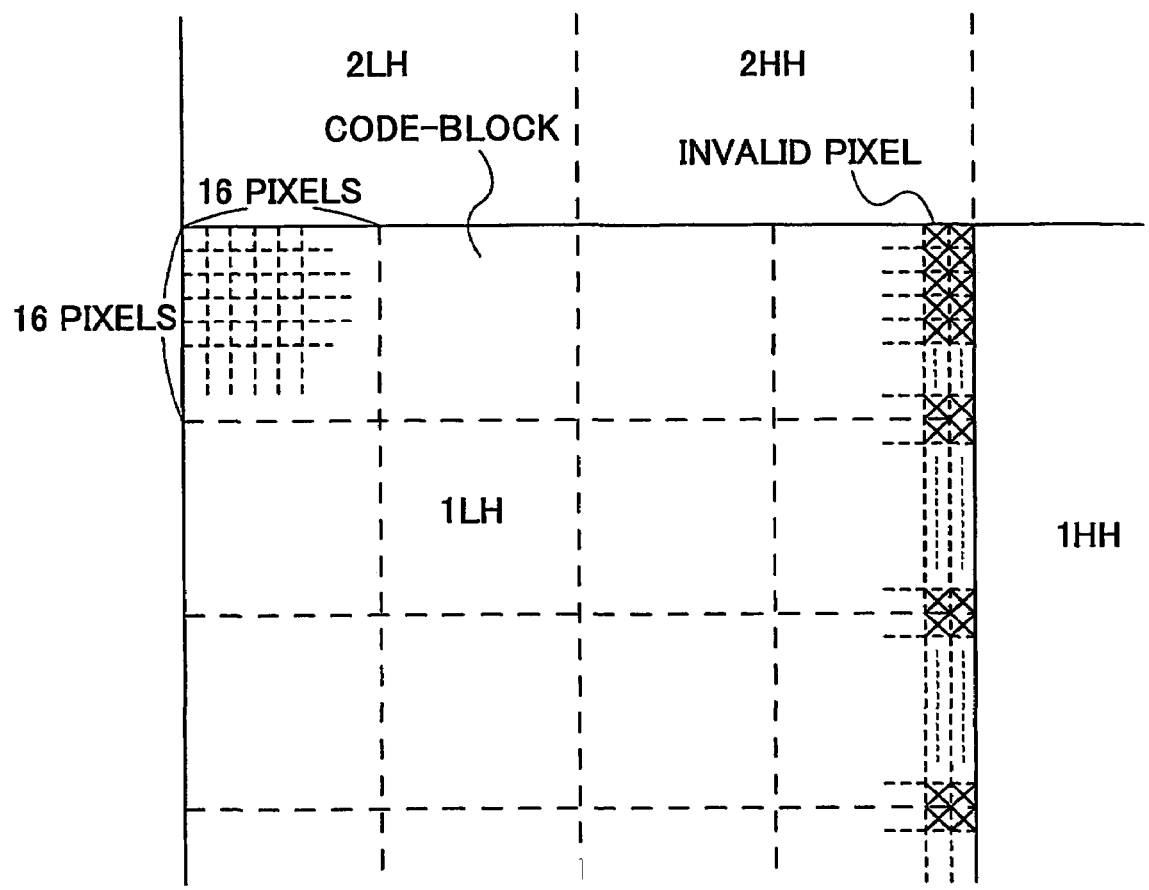
FIG. 5 is an illustrative drawing for explaining effective pixels.

With reference to FIG. 3 again, the wavelet coefficients read from the DRAM 50 by the DMA 21 are supplied not only to the quantization circuit 22 but also to an average computing circuit 26. The average computing circuit 26 computes an average of the wavelet coefficients of effective pixels in each code-block, and outputs the computed average. Here, the effective pixel refers to a pixel that has valid wavelet coefficient data in a code-block that is comprised of a predetermined pixel matrix. When a 1LH sub-band comprised of 64 pixels by 64 pixels is divided into code blocks each comprised of 16 pixels by 16 pixels as shown in FIG. 5, for example, code-blocks lined vertically on the right-hand-side edge do not have valid wavelet coefficient data in the area defined by 16 pixels by 2 pixels marked as "x" in FIG. 5. Accordingly, an average of wavelet coefficients is computed by taking into account only the pixels that are not marked as "x" when such an average needs to be computed for a code-block arranged on the right-hand-side edge. Here, the average computing circuit 26 may be a conventional circuit.

With reference to FIG. 3 again, a masking factor computing circuit 27 determines an additional masking factor, i.e., a masking amount (i.e., the number of coding-pass planes that are to be removed), by specifying either 0, 1, or 2 according to the average of the wavelet coefficients in each code-block as such an average is successively supplied from the average computing circuit 26.

Figure 6:
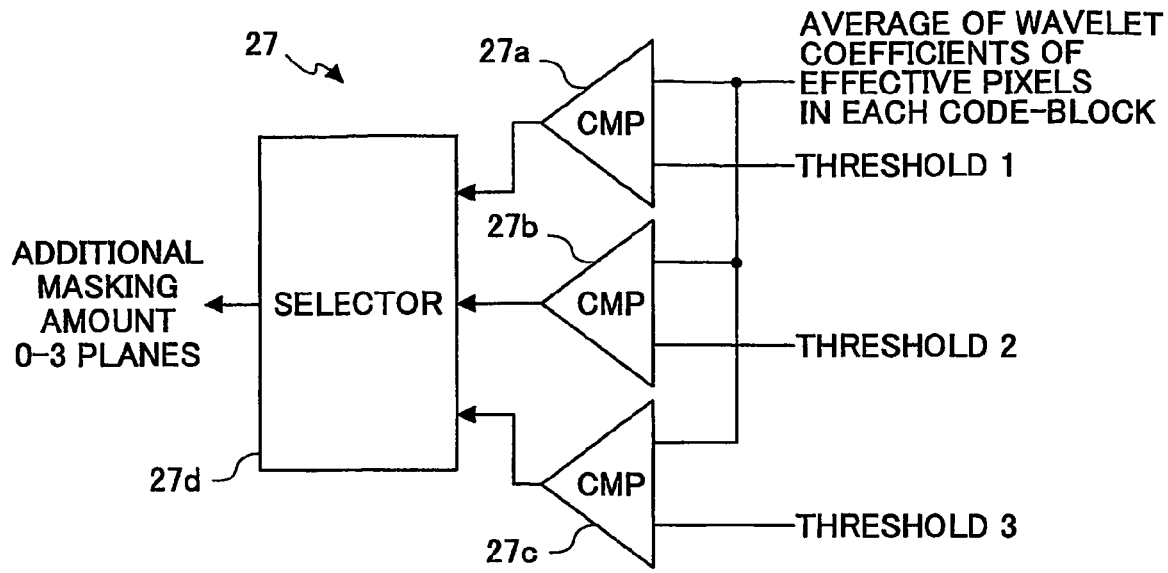
FIG. 6 is a block diagram showing the construction of a masking factor computing circuit.

FIG. 6 is a block diagram showing the construction of the masking factor computing circuit 27. The masking factor computing circuit 27 includes three comparators 27a, 27b, and 27c and a selector 27d. One of the two input terminals of the comparators 27a, 27b, and 27c receives the average value of wavelet coefficients of effective pixels in each code-block, and the other input terminal receives a first threshold, a second threshold, and a third threshold. Here, these thresholds are related as: the first threshold<the second threshold<the third threshold. The comparator 27a outputs a high-level signal if the average value is larger than the first-threshold, and outputs a low-level signal if the average value is smaller. Similarly, the comparator 27b outputs a high-level signal if the average value is larger than the second threshold, and outputs a low-level signal if the average value is smaller. By the same token, the comparator 27c outputs a high-level signal if the average value is larger than the third threshold, and outputs a low-level signal if the average value is smaller.

The selector 27d outputs a masking amount equal to 0 if all the comparator 27a, the comparator 27b, and the comparator 27c supply a low-level signal. The selector 27d outputs a masking amount equal to 1 if the comparator 27a supplies a high-level signal while the comparator 27b and the comparator 27c supply a low-level signal. The selector 27d outputs a masking amount equal to 2 if the comparator 27a and the comparator 27b supply a high-level signal while the comparator 27c supplies a low-level signal. The selector 27d outputs a masking amount equal to 3 if all the comparator 27a, the comparator 27b, and the comparator 27c supply a high-level signal.

With reference to FIG. 3 again, the memory A and the memory B are alternately switched to an enable state in response to each frame image to be processed, and store the masking amount of each code-block of each sub-band supplied from the masking factor computing circuit 27.

Figure 7:
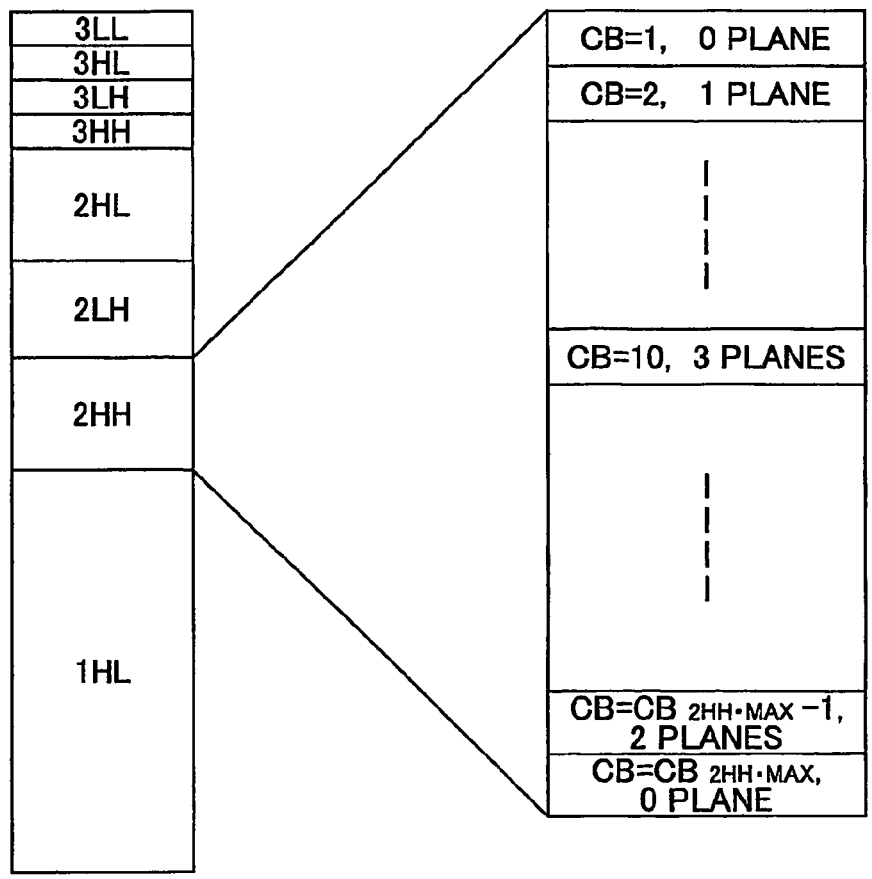
FIG. 7 is an illustrative drawing showing a memory map of a memory A.

FIG. 7 is an illustrative drawing showing a memory map of the memory A. The memory map of the memory B is the same as that of the memory A. As shown in the figure, the masking amount is stored separately for each code-block with respect to individual sub-bands 3LL, 3HL, 3LH, 3HH, 2HL, 2LH, 2HH, 1HL, 1LH, and 1HH. In this figure, the masking amount is stored for CB=1 through $CB_{2HH\cdot MAX}$ in the 2HH sub-band. $CB_{2HH\cdot MAX}$ represents the largest number assigned to a code-block in the given sub-band. In this example, $CB_{2HH\cdot MAX}$ is 16 since the 2HH sub-band has 16 code-blocks.

With reference to FIG. 3 again, the code data output from the arithmetic coding circuit 24 is also supplied to a code-amount computing circuit 28. The code-amount computing circuit 28 computes a code amount of each coding pass corresponding to bitplanes of each code-block, and supplies the computed amount to a data-processing circuit 29. The data-processing circuit 29 also receives the masking amount (i.e., the number of coding-path planes) of each code-block that is stored in the memory A or the memory B. The data-processing circuit 29 computes an amount of code-data removal by taking into account the masking amount when the code data of coding passes of each sub-band are removed plane by plane from the lowest-order bitplane. Data indicative of the amount of code-data removal is then stored in the memory C or the memory D.

Figure 8:
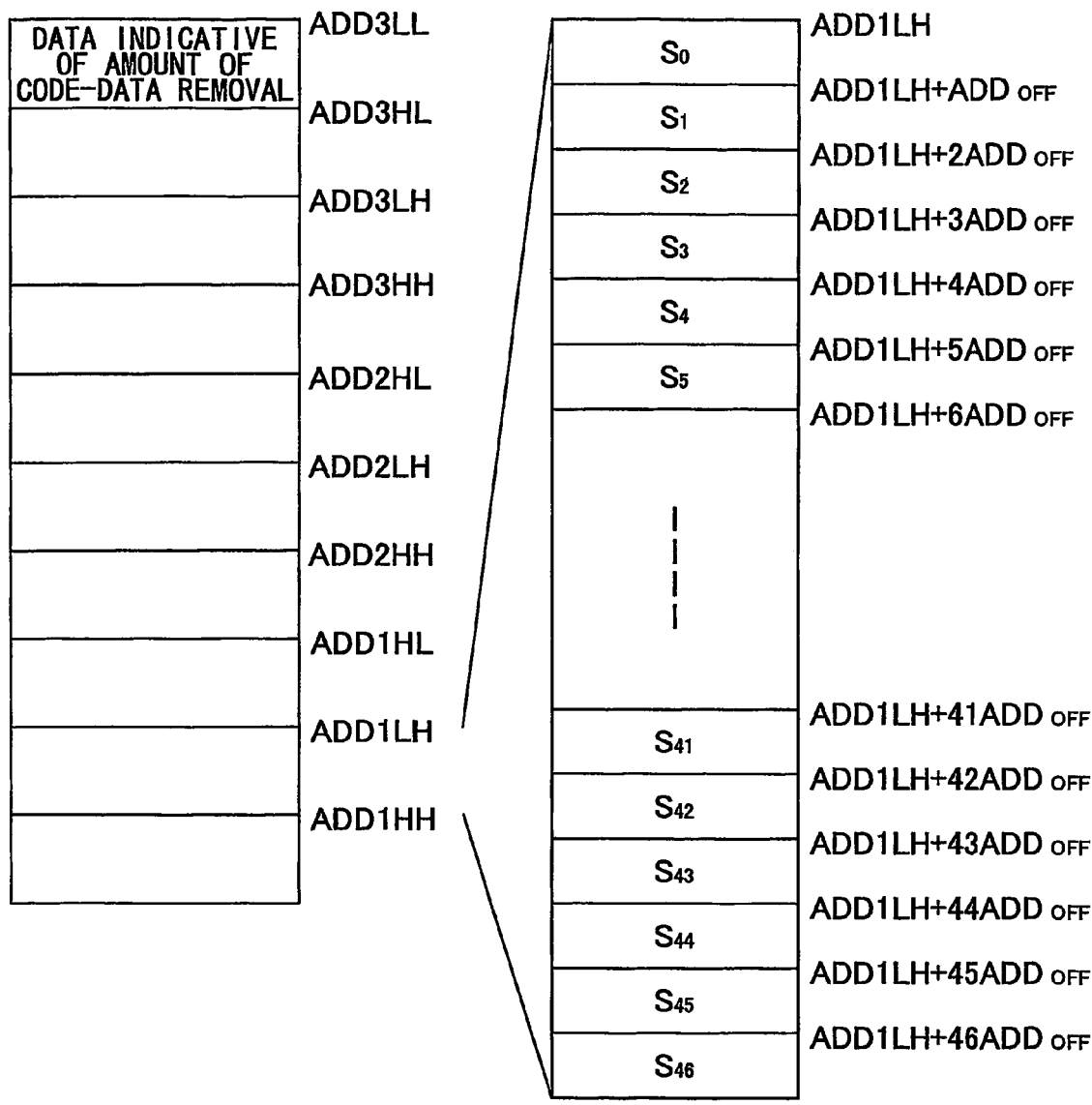
FIG. 8 is an illustrative drawing showing a memory map of a memory C.

FIG. 8 is an illustrative drawing showing a memory map of the memory C. The memory map of the memory D is the same as that of the memory C. As illustrated in the figure, an address ADD3LL stores data indicative of an amount of code-data removal in a case where the 46 planes of coding passes in the 3LL sub-band are successively removed in an ascending order of bitplanes starting from the lowest-order bitplane. The same is said of an address ADD3HL, an address ADD3LH, an address ADD3HH, an address ADD2HL, an address ADD2LH, an address ADD2HH, an address ADD1HL, an address ADD1LH, and an address ADD1HH.

FIG. 8 further shows the detail of data stored in the memory space of the addresses ADD1LH-ADD1HH. The amount Sn (n=0-46) of code-data removal when the code data of each coding pass is successively removed with the lowest-order bitplane first is represented by use of a fixed number of bits (e.g., 20 bits). An offset address $ADD_{OFF}$ for allocation of a data storage area for these 20 bits is determined first. Then, the amounts Sn of code-data removal corresponding to the removal of 0 to 46 planes of coding passes are stored at addresses that are obtained by adding to the address ADD1LH a multiple of the offset address corresponding to the number of removed coding-pass planes. That is, such addresses are ADD1LH, ADD1LH+$ADD_{OFF}$, ADD1LH+2×$ADD_{OFF}$, ADD1LH+3×$ADD_{OFF}$, ..., and ADD1LH+46×$ADD_{OFF}$.

Figure 9:
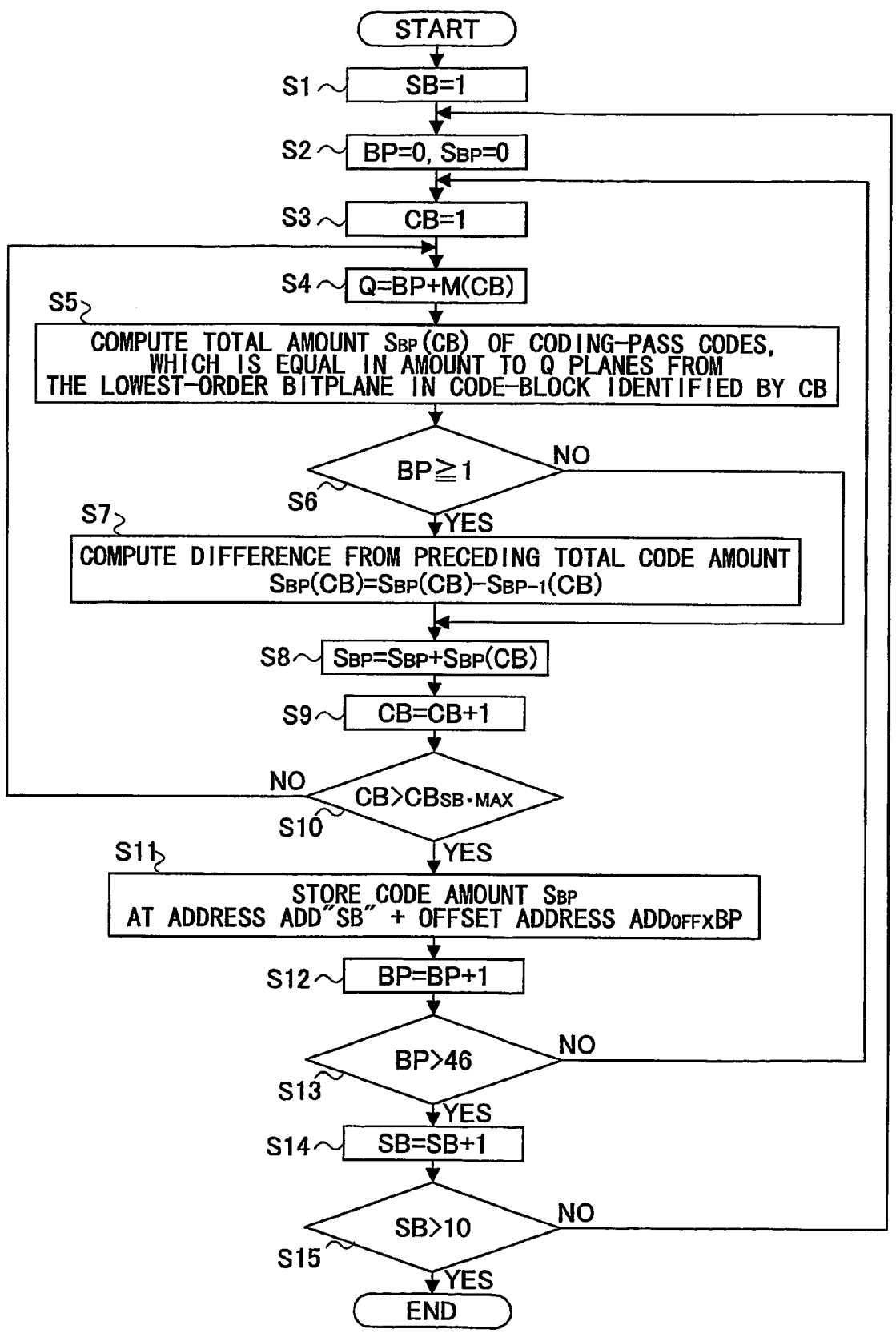
FIG. 9 is a flowchart showing state transitions of a data-processing circuit.

FIG. 9 is a flowchart showing state transitions of the data-processing circuit 29. Such state transitions may be fed into a logic synthesizing tool made by the Synopsys corporation (U.S.), thereby automatically generating a specific circuit design. In the following, the state transitions will be described. First, a sub-band identifier parameter SB is defined to identify individual sub-bands. Namely, SB=1 corresponds to 3LL, SB=2 to 3HL, SB=3 to 3LH, SB=4 to 3HH, SB=5 to 2HL, SB=6 to 2LH, SB=7 to 2HH, SB=8 to 1HL, SB=9 to 1LH, and SB=10 to 1HH.

The parameter SB is set to "1" (step S1). A parameter BP indicative of the number of coding-pass planes to be removed is set to "0", and a variable $S_{BP}$ is set to "0" (step S2) where the variable $S_{BP}$ indicates a code amount (a change in the code data amount) that decreases in response to the removal of coding-pass code data of a BP-th plane from where the lowest-order bitplane is located. A parameter CB indicative of a code-block in the sub-band identified by the parameter SB is set to "1" (step S3).

The masking amount M(CB) of a code-block identified by the parameter CB is added to the parameter BP, and the resulting value is set as a parameter Q indicative of the number of coding-pass planes that are to be removed in the identified code block (step S4). A total amount $S_{BP}$(CB) of coding-pass codes is computed (step S5), which is equal in amount to the Q planes from the lowest-order bitplane in the code-block identified by the parameter CB.

If the parameter BP is 0, that is, only the code data corresponding to the masking amount is to be removed (NO at step S6), the code amount $S_{BP}$ is set to $S_{BP}$(CB) (step S8).

If the parameter BP is equal to or more than 1 (YES at step S6), preceding $S_{BP-1}$(CB) is subtracted from $S_{BP}$(CB), and a resulting value is regarded as $S_{BP}$(CB) (step S7). $S_{BP}$(CB) is then added to $S_{BP}$, and a resulting value is regarded as the code amount $S_{BP}$ (step S8).

"1" is added to the parameter CB (step S9). If the parameter CB is below $CB_{SB-MAX}$ that is the largest number assigned to a code-bock in a sub-band identified by the parameter SB (No at step S10), the procedure goes back to step S4. If the parameter CB is above $CB_{SB-MAX}$ (Yes at step S10), the code amount $S_{BP}$ is stored at an address that is obtained by adding an offset address $ADD_{OFF}$×BP to an address ADD"SB" in a currently selected memory (step S11), which is either the memory A or the memory B alternately switched to an enable state in synchronization with each frame. The address ADD"SB" is an address ADD3LL as shown in FIG. 8 if the parameter SB is 1, for example.

"1" is added to the parameter BP (step S12). If the parameter BP is 46 or smaller (No at step S13), the procedure returns to step S3 that was previously described. On the other hand, if the parameter BP exceeds 46, i.e., if the processing of all the 46 coding-pass planes is completed in the sub-band identified by the parameter SB (Yes at step S13), the parameter SB is incremented by "1" for processing of a next sub-band (step S14). If the parameter SB is equal to or smaller than 10 that is the largest number as previously defined (No at step S15), the procedure goes back to step S2. If the parameter SB exceeds 10 (Yes at step S15), it is ascertained that the processing of all the sub-bands is completed. With this, the procedure comes to an end.

It should be noted that the procedure based on the state transitions as described above may be implemented as software processing performed by a central processing unit. The flowchart in this case is the same as the one shown in FIG. 9.

(1-2-3) Packet Header Generating Unit

The packet header generating unit 30 determines a data sequence number of truncation data that is suitable for the removal of a desired amount of code data when the code data of coding passes obtained by the arithmetic coding unit 20 in each sub-band are removed plane by plane with the lowest-order bitplane first. Here, the determination of a data sequence number is made based on the amount of code-data removal that takes into account the masking amount of each code-block. A packet header is generated for code data generated from the truncation data of the identified data sequence number, and a formulated bit stream is output.

A rate control circuit 32 retrieves the truncation data of No. 128 as defined in the table of FIG. 2 from the DRAM 50 by use of the DMA 31, and computes a total of code-data removal amounts in all the sub-bands where the code-data removal amounts are specified by the retrieved truncation data in respective code-blocks. The total is compared with a desired removal amount. If the desired removal amount is not yet achieved, truncation data of a larger data sequence number is retrieved, followed by obtaining a total of data removal amounts in all the sub-bands according to the retrieved truncation data. Conversely, if the total of code-data removal amounts is larger than the desired removal amount, truncation data having a smaller data sequence number is retrieved for further computation of the code-data removal amount. In this manner, the data sequence number that provides a code-date removal amount substantially equal to the desired removal amount is identified, and, then, data indicative of this data sequence number is supplied to a packet information generating circuit 34 provided at a subsequent stage.

Figure 10:
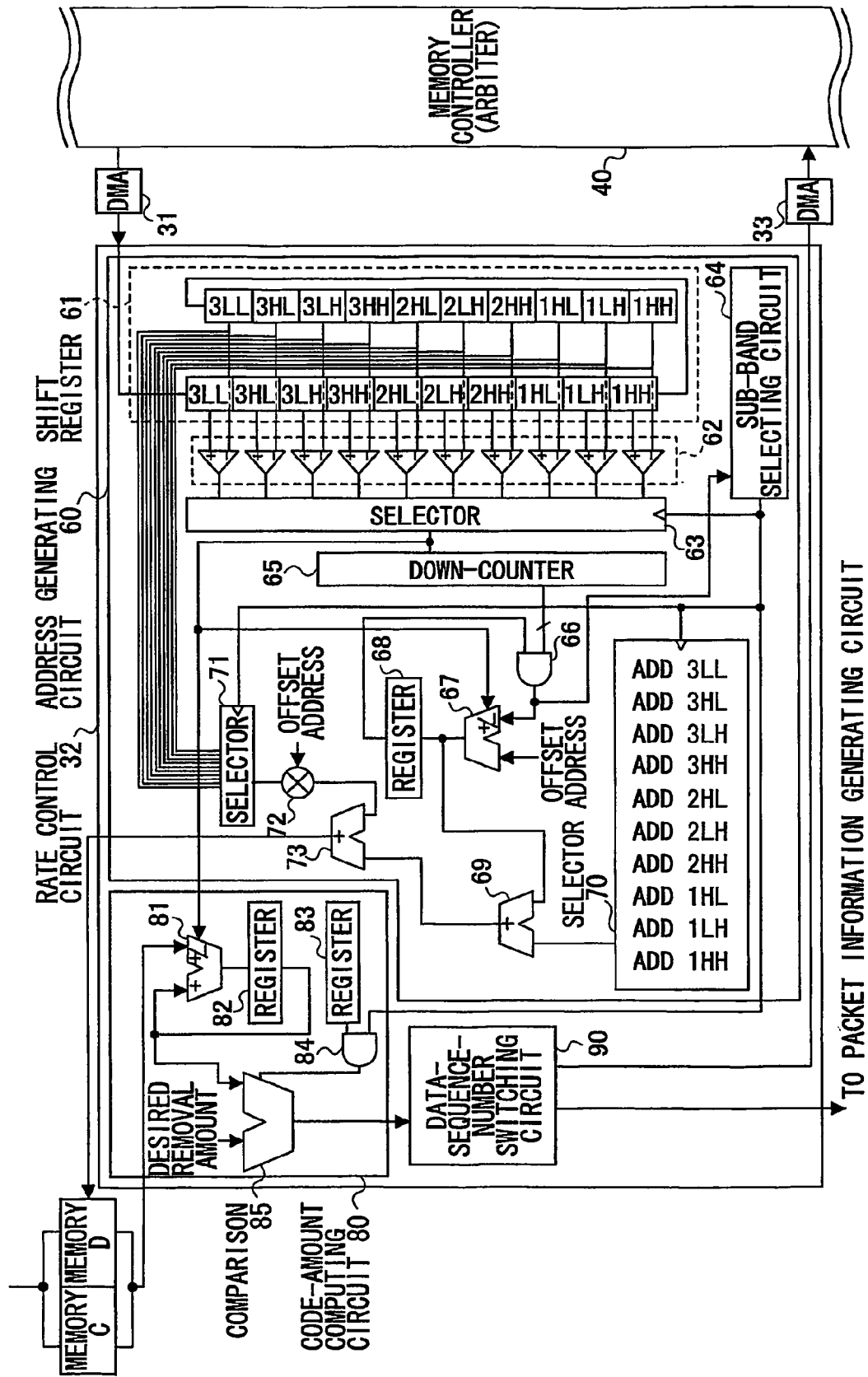
FIG. 10 is a circuit diagram showing the construction of a rate control circuit.

FIG. 10 is a circuit diagram showing the construction of the rate control circuit 32. The rate control circuit 32 mainly includes an address generating circuit 60, a code-amount computing circuit 80, and a data-sequence-number switching circuit 90.

The address generating circuit 60 and the code-amount computing circuit 80 function as an operation unit. This operation units retrieves truncation data of a specified data sequence number from the truncation table, and computes a change in the code data amount when lower-order bits of code data are removed independently in each processing unit according to the retrieved truncation data.

The address generating circuit 60 generates an address at which data indicative of a code amount of bitplanes is retrieved, such bitplanes being subject to addition or subtraction according to the truncation data supplied through the DMA 31. The generated address is supplied to the memory C and the memory D. One of the memories C and D stores data of an image frame that is currently processed, and is in an enable state. This memory supplies the data indicative of code-data removal amount stored at the specified address to the code-amount computing circuit 80.

The code-amount computing circuit 80 obtains a total of the data removal amounts supplied from the memory C or the memory D with respect to all the sub-bands, and compares the obtained total with a desired removal amount, followed by transmitting a signal indicative of comparison results to the data-sequence-number switching circuit 90 provided at the subsequent stage.

The data-sequence-number switching circuit 90 requests truncation data of a different data sequence number to the DRAM 50 by use of the DMA 33 according to the signal indicative of comparison results supplied from the code-amount computing circuit 80. Moreover, a signal indicative of a final data sequence number that achieves a code-data removal amount substantially equal to the desired removal amount is transmitted to the packet information generating circuit 36.

In the following, a description will be given of the address generating circuit 60, the code-amount computing circuit 80, and the data-sequence-number switching circuit 90 with respect to its construction and operation in further detail.

The truncation data supplied by the DMA 31 from the DRAM 50 is provided to a shift register 61 of the address generating circuit 60. The shift register 61 stores the truncation data of a current turn and the truncation data of a preceding turn. A comparator 62 subtracts the truncation data of a preceding turn from the truncation data of a current turn with respect to each sub-band (3LL, 3HL, 3LH, 3HH, 2HL, 2LH, 2HH, 1HL, 1LH, 1HH), and supplies a resulting value to a selector 63. As will be described later, the truncation data of a preceding turn for each sub-band is supplied to a selector 71.

A sub-band selecting circuit 64 updates a sub-band selecting signal for selecting of a next sub-band in response to a signal requesting the updating of the selecting signal. The updated signal is output. A selector 63 outputs data indicative of a comparison result to a down-counter 65 in the order of sub-bands 3LL, 3HL, 3LH, 3HH, 2HL, 2LH, 2HH, 1HL, 1LH, and 1HH in response to the selecting signal supplied from the sub-band selecting circuit 64. The data indicative of a comparison result refers to a difference "+2" if the truncation data of a preceding turn is "1" and the truncation data of a current turn is "3" for a 1HL sub-band if the selecting signal points to the 1HL sub-band, for example. The selector 63 outputs data indicative of "+2" as a comparison result to the down-counter 65.

The down-counter 65 is set such that a count is down by a number equal to the difference that is output from the selector 63, and downward counting is conducted. A resulting count is supplied to part of the signal input terminals of an AND gate 66. The remaining signal input terminal of the AND gate 66 receives an output signal of a register 68. That is, the AND gate 66 passes the output of the register 68 to one of the two signal input terminals of an operation unit 67 while the down-counter 65 is performing downward-counting. When the down-counter 65 completes downward-counting, the AND gate 66 outputs a low-level signal. The low-level signal is supplied to the sub-band selecting circuit 64 as a signal requesting the updating of a selecting signal.

The addition/subtraction control terminal of the operation unit 67 receives code data signal that is output from the selector 63. That is, the operation unit 67 cumulates the offset address $ADD_{OFF}$ in synchronization with the count timing of the down-counter 65 for supplying to one of the signal input terminals of an adder 69 while a positive-indication signal is supplied as the addition/subtraction control signal. Conversely, when a negative-indication signal is supplied as the addition/subtraction control signal, the offset address $ADD_{OFF}$ is subtracted from the data stored in the register 68 in synchronization with the count timing of the down-counter 65.

The selector 70 supplies an address ADD (ADD3LL-ADD1HH) of a sub-band corresponding to the selecting signal output from the sub-band selecting circuit 64 to the other signal input terminal of the adder 69. The adder 69 adds, to the sub-band address ADD output from the selector 70, a multiple of the offset address $ADD_{OFF}$ cumulated as many as there are downward counting performed by the down-counter 65, thereby supplying resulting address data to one of the signal input terminals of an adder 73. The other signal input terminal of the adder 73 receives data that is obtained by a multiplier 72 multiplying the output of a selector 71 by the offset address $ADD_{OFF}$. The selector 71 outputs the truncation data of a preceding turn in respect of a sub-band that is specified by the selecting signal of the sub-band selecting circuit 64. With this provision, the adder 73 generates and outputs an address for reading data indicative of code amount that increases or decreases on a sub-band-by-sub-band basis in synchronization with the downward counting of the down-counter 65.

The addition/subtraction control terminal of an operation unit 81 of the code-amount computing circuit 80 receives an addition/subtraction control signal generated by the address generating circuit 60. The operation unit 81 receives, at one of its signal input terminals, data indicative of a code-data removal amount from a specified address of an enabled one of the memory C and the memory D as such address is specified by the address generating circuit 60. The other signal input terminal of the operation unit 81 receives the previous output of the operation unit 81 through a register 82. With this provision, the register 82 stores the amount of code-data removal responsive to the truncation data currently selected.

One of the two signal input terminals of an AND gate 84 receives the selecting signal from the sub-band selecting circuit 64 of the address generating circuit 60. The remaining signal input terminal of the AND gate 84 is coupled to the register 83. The register 83 stores data of the same value as the selecting signal that is output after the sub-band 1HH is selected, i.e., after the selection of all the sub-bands is completed. This includes a case in which the selecting signal indicates the sub-band 3LL by returning to the starting point. With this provision, an AND gate 84 supplies a high-level enable-signal to the enable terminal of a comparator 85 after the selection of all the sub bands is completed by the sub-band selecting circuit 64. The comparator 85 compares a desired removal amount with the code-data removal amount of all the sub-bands supplied from the register 82. The comparator 85 supplies a high-level signal indicative of a comparison result if the code-data removal amount is larger than the desired removal amount, and supplies a low-level signal indicative of a comparison result if the code-data removal amount is smaller than the desired removal amount.

Figure 11:
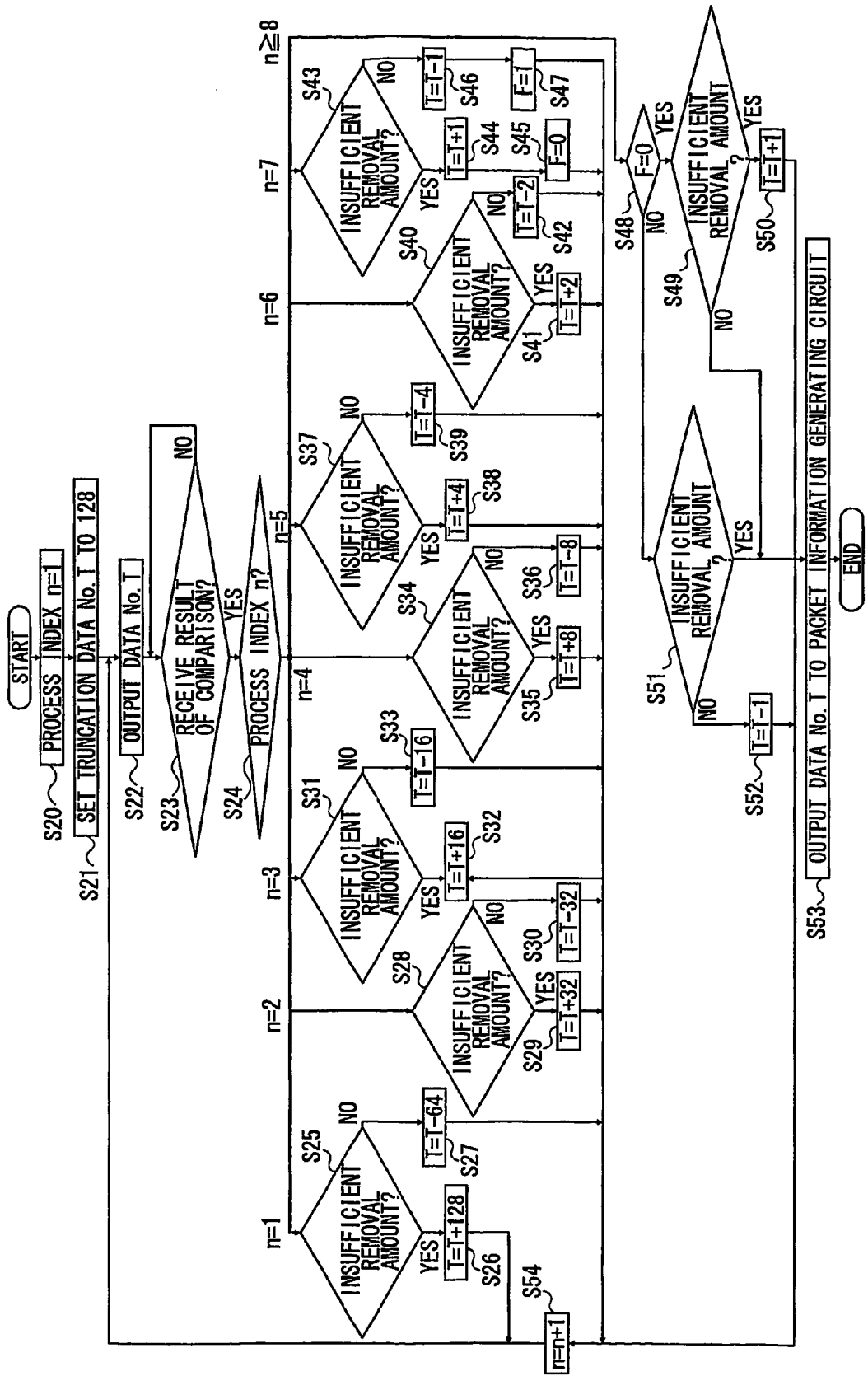
FIG. 11 is a flowchart showing the state transitions of a data-sequence-number switching circuit.

FIG. 11 is a flowchart showing the state transitions of the data-sequence-number switching circuit 90. Such state transitions may be fed into a logic synthesizing tool made by the Synopsys corporation (U.S.), thereby automatically generating a specific circuit design. In the following, the state transitions will be described.

First, the value of a process index n is set to "1" (step S20), and data sequence number T of truncation data is set to "128" (step S21). The data sequence number T is then output to the DMA 33 (step S22). A waiting period starts so as to wait for a signal to be supplied from the comparator 85 of the code-amount computing circuit 80 where such signal indicates a result of comparison between the desired removal amount and the code-data removal amount of all the sub-bands computed based on the truncation data of the data sequence number T (No at step S23). If the signal indicative of a comparison result is received (Yes at step S23), the following procedure is performed in accordance with the process index n (step S24). Here, the procedure to be performed is dependent on whether the signal indicative of a comparison result indicates that the code-data removal amount exceeds the desired removal amount (i.e., the signal being high) or that the code-data removal amount is below the desired removal amount (i.e., the signal being low).

Specifically, if the index n is 1 and the code-data removal amount does not reach the desired removal amount (Yes at step S25), the current data sequence number T (=128) is incremented by 128 (step S26), and the procedure returns to step S22. As a result, the process index n is maintained at "1" if the code-data removal amount is smaller than the desired removal amount. On the other hand, if the code-data removal amount is larger than the desired removal amount (No at step S25), the current data sequence number T (=128) is decreased by subtracting 64 from the number (step S27), and the procedure returns to step S22 after the process index n is incremented by 1.

If the index n is 2 at step S24 and the code-data removal amount does not reach the desired removal amount (Yes at step S28), the current data sequence number T is incremented by 32 (step S29) and the procedure returns to step S22 after the process index n is incremented by 1 (step S54). If, on the other hand, the code-data removal amount is larger than the desired removal amount (No at step S28), the current data sequence number T is decreased by subtracting 32 from the number (step S30), and the procedure returns to step S22 after the process index n is incremented by 1 (step S54).

If the index n is 3 at step S24 and the code-data removal amount does not reach the desired removal amount (Yes at step S31), the current data sequence number T is incremented by 16 (step S32) and the procedure returns to step S22 after the process index n is incremented by 1 (step S54). If, on the other hand, the code-data removal amount is larger than the desired removal amount (No at step S31), the current data sequence number T is decreased by subtracting 16 from the number (step S33), and the procedure returns to step S22 after the process index n is incremented by 1 (step S54).

If the index n is 4 at step S24 and the code-data removal amount does not reach the desired removal amount (Yes at step S34), the current data sequence number T is incremented by 8 (step S35) and the procedure returns to step S22 after the process index n is incremented by 1 (step S54). If, on the other hand, the code-data removal amount is larger than the desired removal amount (No at step S34), the current data sequence number T is decreased by subtracting 8 from the number (step S36), and the procedure returns to step S22 after the process index n is incremented by 1 (step S54).

If the index n is 5 at step S24 and the code-data removal amount does not reach the desired removal amount (Yes at step S37), the current data sequence number T is incremented by 4 (step S38) and the procedure returns to step S22 after the process index n is incremented by 1 (step S54). If, on the other hand, the code-data removal amount is larger than the desired removal amount (No at step S37), the current data sequence number T is decreased by subtracting 4 from the number (step S36), and the procedure returns to step S22 after the process index n is incremented by 1 (step S54).

If the index n is 6 at step S24 and the code-data removal amount does not reach the desired removal amount (Yes at step S40), the current data sequence number T is incremented by 2 (step S41) and the procedure returns to step S22 after the process index n is incremented by 1 (step S54). If, on the other hand, the code-data removal amount is larger than the desired removal amount (No at step S40), the current data sequence number T is decreased by subtracting 2 from the number (step S36), and the procedure returns to step S22 after the process index n is incremented by 1 (step S54).

If the index n is 7 at step S24 and the code-data removal amount does not reach the desired removal amount (Yes at step S43), the current data sequence number T is incremented by 1 (step S44) and the procedure returns to step S22 after a flag F is set to "0" (step S45) and the process index n is incremented by 1 (step S54). If, on the other hand, the code-data removal amount is larger than the desired removal amount (No at step S43), the current data sequence number T is decreased by subtracting 1 from the number (step S46), and the procedure returns to step S22 after the flag F is set to "1" (step S47) and the process index n is incremented by 1 (step S54).

If the process index n is 8 or larger at step S24, the following procedure is performed according to the setting of the flag F. If the flag F is 0 (Yes at step S48) and the code-data removal amount does not reach the desired removal amount (Yes at step S49), the data sequence number T is incremented by 1 (step S50), and the procedure returns to step S22 after the process index n is incremented by 1 (step S54). If, on the other hand, the flag F is 1 (No at step S48) and the code-data removal amount is larger than the desired removal amount (No at step S51), the data sequence number T is decreased by subtracting 1 from the number (step S52), and the procedure returns to step S22 after the process index n is incremented by 1 (step S54).

If the flag F is 0 (Yes at step S48) and the code-data removal amount is larger (No at Step S49), or if the flag F is 1 (No at step S48) and the code-data removal amount stops short (Yes at Step S49), a change by plus/minus 1 in the data sequence number of the truncation data will cause a turn of situations between the code-data removal amount being smaller than the desired removal amount and the code-data removal amount being larger than the desired removal amount. In other words, it is reasonable to ascertain that the code-data removal amount has reached the desired removal amount. Accordingly, the current data sequence number T is regarded as a data sequence number of truncation data to be actually used, and a signal indicative of this data sequence number T is supplied to the packet information generating circuit 34 (step S53). With this, the procedure comes to an end.

It should be noted that the procedure based on the state transitions as described above may be implemented as software processing performed by a central processing unit. The flowchart in this case is the same as the one shown in FIG. 11.

The truncation table may be configured such that as the data sequence number increases, the code removal amount decreases with increasing improvement in the quality of reproduced images. In such case, the initial value of the data sequence number is set to a data sequence number that is 128-th from the last in the table, rather than set to 128 at step S21 as described above. Further, at the steps that cause changes in the data sequence number, addition and subtraction should be exchanged. For example, the addition of 32 to the table sequence number is changed to the subtraction of 32 from the table sequence number.

With reference to FIG. 3 again, the packet information generating circuit 34 computes the number of coding passes and their code amounts in each sub-band specified by the truncation data of the ultimately chosen data sequence number, and supplies the computed data to the packet header generating circuit 36.

Figure 12:
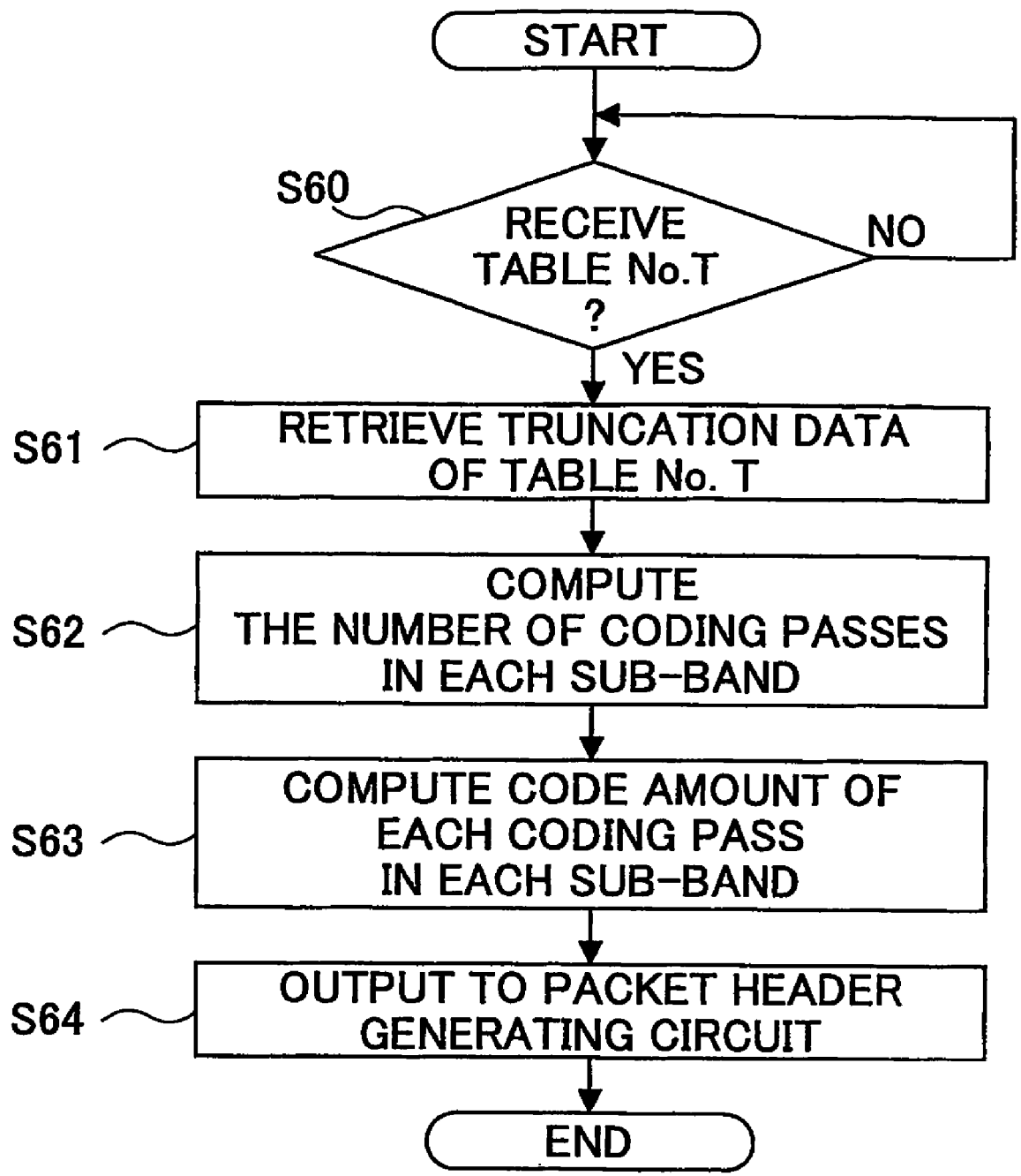
FIG. 12 is a flowchart showing the state transitions of a packet information generating circuit.

FIG. 12 is a flowchart showing the state transitions of the packet information generating circuit. Such state transitions may be fed into a logic synthesizing tool made by the Synopsys corporation (U.S.), thereby automatically generating a specific circuit design. In the following, the state transitions will be described. First, a waiting period starts to wait for data indicative of the data sequence number T to be supplied from the rate control circuit 32 (No at step S60). If the data indicative of the data sequence number T is received (Yes at step S60), the truncation data of the data sequence number T is read from the DRAM 50 (step S61). In the code-blocks of each sub-band, the number of coding passes that remain after code-data removal is computed from the retrieved truncation data (step S62). Based on the retrieved truncation data, also, the code amount that remains after code-data removal in the code-blocks of each sub-band is computed from the data stored in the memory C or the memory D (step S63). The number of coding passes and the code amount computed in the manner described above for the code-blocks of each sub-band are supplied to the packet header generating circuit 36 (step S64).

It should be noted that the procedure based on the state transitions as described above may be implemented as software processing performed by a central processing unit. The flowchart in this case is the same as the one shown in FIG. 12.

With reference to FIG. 3 again, the packet header generating circuit 36 generates a packet header for outputting to a code forming circuit 38. Here, the packet header is generated mainly based on the number of coding passes and the code amount of the code-blocks of each sub-band computed by the packet information generating circuit 34, the number of zero bitplanes, and code data supplied from the DRAM 50 by the DMA 37. The code forming circuit 38 forms a bit stream from the data supplied from the packet header generating circuit 36, and outputs it to an exterior as code data that has been reduced by a desired code amount. The packet header generating circuit 36 may be a conventional circuit.

(2) SECOND EMBODIMENT

Figure 13:
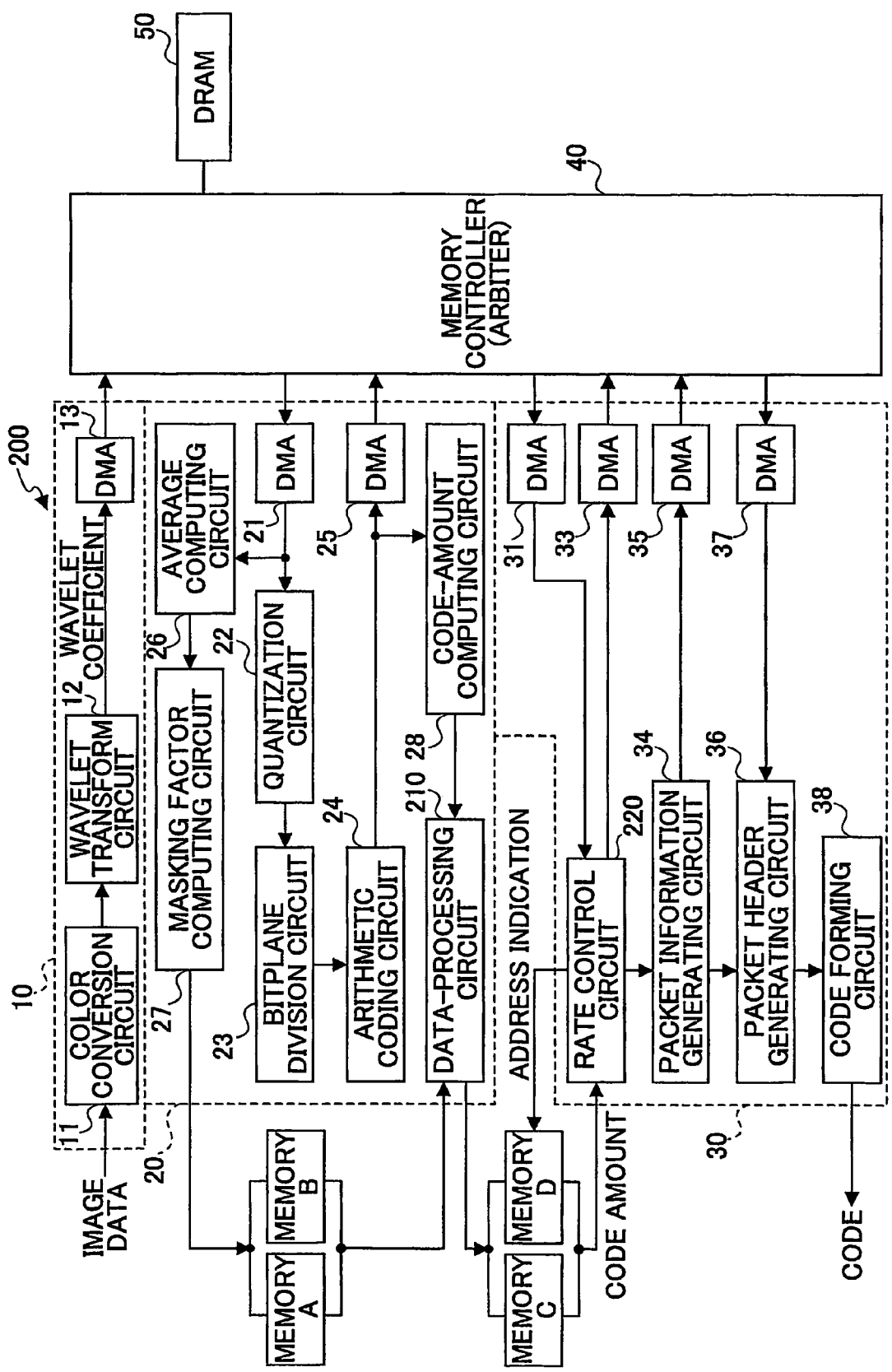
FIG. 13 is a block diagram showing the construction of an image compressing apparatus according to a second embodiment.

FIG. 13 is a block diagram showing the construction of an image compressing apparatus 200 according to the second embodiment. The image compressing apparatus 200 according to the second embodiment identifies optimum truncation data by comparing a total amount of code data with a desired code amount where the total amount of code data is obtained from a masking amount of each code-block of each sub-band and a code amount of each coding pass of each code-block. The total amount of code data is what remains after coding passes in each sub-band are removed based on the truncation data.

The construction of the image compressing apparatus 200 according to the second embodiment is basically the same as that of the image compressing apparatus 100 according to the first embodiment described above (see FIG. 3). In the following, a description will be given of a data-processing circuit 210 and a rate control circuit 220, which differ from those of the image compressing apparatus 100. For the sake of convenience of explanation, the same elements as those of the image compressing apparatus 100 of the first embodiment are referred to by the same numerals.

Figure 14:
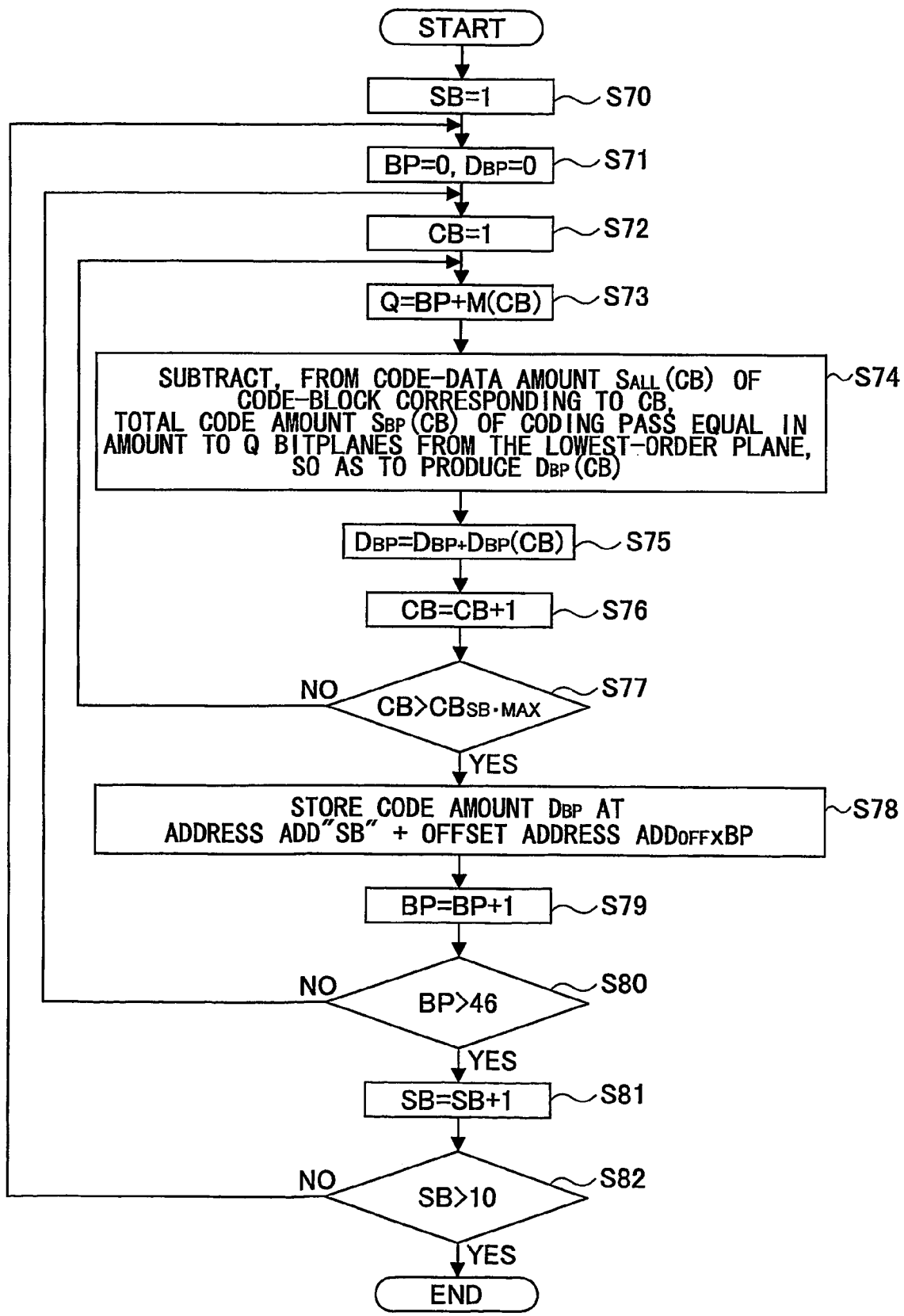
FIG. 14 is a flowchart showing the state transitions of a data-processing circuit of the image compressing apparatus of FIG. 13.

FIG. 14 is a flowchart showing the state transitions of the data-processing circuit 210 of the image compressing apparatus 200. The data-processing circuit 210 corresponds to the data-processing circuit 29 of the image compressing apparatus 100 of the first embodiment shown in FIG. 3. Such state transitions may be fed into a logic synthesizing tool made by the Synopsys corporation (U.S.), thereby automatically generating a specific circuit design. In the following, the state transitions will be described.

First, a sub-band identifier parameter SB is defined to identify individual sub-bands. Namely, SB=1 corresponds to 3LL, SB=2 to 3HL, SB=3 to 3LH, SB=4 to 3HH, SB=5 to 2HL, SB=6 to 2LH, SB=7 to 2HH, SB=8 to 1HL, SB=9 to 1LH, and SB=10 to 1HH.

The parameter SB is set to "1" (step S70). A parameter BP indicative of the number of coding-pass planes to be removed is set to "0", and a variable $D_{BP}$ is set to "0" (step S71) where the variable $D_{BP}$ indicates a total code amount remaining in a code-block from which BP planes of coding-pass code data are removed successively with the lowest-order bitplane first. A parameter CB indicative of one of the sequence numbers that are successively assigned to code-blocks in the sub-band identified by the parameter SB is set to "1" (step S72).

A masking amount M(CB) to be removed in a code-block identified by the parameter CB is added to the parameter BP, and a resulting value is set as a parameter Q indicative of the number of coding-pass planes that are to be removed in the identified code block (step S73). A total code-data amount $S_{ALL}$(CB) in the code-block corresponding to the parameter CB is identified from the output of the code-amount computing circuit 28, and a total code amount $S_{BP}$(CB) that is equal in amount to Q coding-pass planes is obtained from the memory A or the memory B, followed by subtracting $S_{BP}$(CB) from $S_{ALL}$(CB) to produce a variable $D_{BP}$(CB) (step S74) $D_{BP}$(CB) obtained above is added to a variable $D_{BP}$ that indicates a total amount of code data in the processed code block (step S75).

"1" is added to the parameter CB (step S76). If the parameter CB is below $CB_{SB\text{-}MAX}$ that is the largest number assigned to a code-bock in a sub-band identified by the parameter SB (No at step S77), the procedure goes back to step S73. If the parameter CB is above $CB_{SB\text{-}MAX}$ (Yes at step S77), the code amount data $D_{BP}$ is stored at an address that is obtained by adding an offset address $ADD_{OFF}$×BP to an address ADD"SB" in a currently selected memory, which is either the memory C or the memory D alternately switched to an enable state in synchronization with each frame. The address ADD"SB" is an address ADD3LL if the parameter SB is 1, for example.

"1" is added to the parameter BP (step S79). If the parameter BP is 46 or smaller (No at step S80), the procedure returns to step S72 that was previously described. On the other hand, if the parameter BP exceeds 46, i.e., if the processing of all the 46 coding-pass planes is completed in the sub-band identified by the parameter SB (Yes at step S80), the parameter SB is incremented by "1" for processing of a next sub-band (step S81). If the parameter SB is equal to or smaller than 10 that is the largest number as previously defined (No at step S82), the procedure goes back to step S71. If the parameter SB exceeds 10 (Yes at step S82), it is ascertained that the processing of all the sub-bands is completed. With this, the procedure comes to an end.

It should be noted that the procedure based on the state transitions as described above may be implemented as software processing performed by a central processing unit. The flowchart in this case is the same as the one shown in FIG. 14.

FIG. 15 is an illustrative drawing showing a memory map of the memory C or the memory D of the image compressing apparatus 200. As illustrated in the figure, an address ADD3LL stores data indicative of a total amount of code data remaining after the 46 planes of coding-pass code data in the 3LL sub-band are successively removed with the lowest-order bitplane first and after a specified number of planes of coding-pass code data are further removed as specified by the masking amount that is identified independently for each code-block. The same is said of an address ADD3HL, an address ADD3LH, an address ADD3HH, an address ADD2HL, an address ADD2LH, an address ADD2HH, an address ADD1HL, an address ADD1LH, and an address ADD1HH.

FIG. 15 further shows the detail of data stored in the memory space of the addresses ADD2HH-ADD1HL. The amount Dn (n=0-46) of code data is represented by use of a fixed number of bits (e.g., 20 bits) where the amount Dn indicates an amount remaining after code data of each coding pass in the sub-band 2HH are successively removed with the lowest-order bitplane first and after a specified number of planes of coding-pass code data are further removed as specified by the masking amount that is identified independently for each code-block. An offset address $ADD_{OFF}$ for allocation of a data storage area for these 20 bits is determined first. Then, the code amounts Dn remaining after the removal of 0 to 46 planes of coding passes are stored at addresses that are obtained by adding to the address ADD2HH a multiple of the offset address corresponding to the number of removed coding-pass planes. That is, such addresses are ADD2HH, $ADD2HH+ADD_{OFF}$, $2HH+2\times ADD_{OFF}$, $2HH+3\times ADD_{OFF}$, ..., and $2HH+46\times ADD_{OFF}$.

Figure 16:
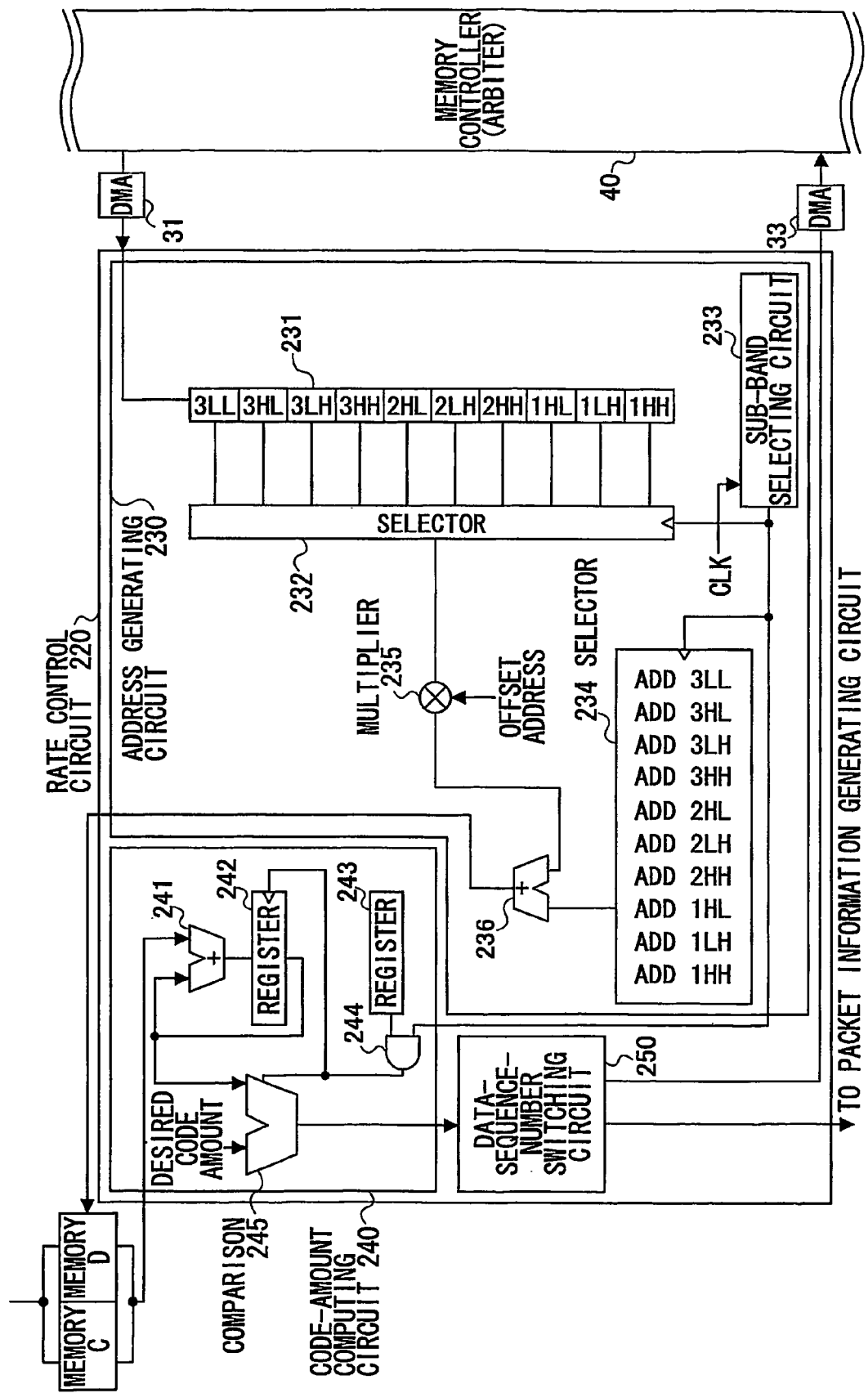
FIG. 16 is a circuit diagram showing the construction of a rate control circuit of the image compressing apparatus of FIG. 13.

FIG. 16 is a circuit diagram showing the construction of the rate control circuit 220 of the image compressing apparatus 200. The rate control circuit 220 reads truncation data of sequence number 128 from the DRAM 50 by use of the DMA 31. Based on the retrieved truncation data, the rate control circuit 220 reads code amounts after removal of code data in each sub-band from the memory C or the memory D, and computes a sum of these amounts, followed by comparing the sum with a desired code amount. If the code amount is larger than the desired code amount, truncation data of a larger data sequence number is retrieved, followed by obtaining a code amount after code-data removal according to the retrieved truncation data. Conversely, if the code amount after the removal of code data is smaller than the desired code amount, truncation data having a smaller data sequence number is retrieved, followed by obtaining a code amount after code-data removal according to the retrieved truncation data. In this manner, the data sequence number that provides a post-removal code amount substantially equal to the desired code amount is identified, and, then, data indicative of this data sequence number is supplied to the packet information generating circuit 34 provided at a subsequent stage.

The address generating circuit 230 generates an address, at which data indicative of a post-removal code amount is retrieved, according to the truncation data supplied through the DMA 31. The generated address is supplied to the memory C and the memory D. One of the memories C and D stores data of an image frame that is currently processed, and is in an enable state. This memory supplies the data indicative of the post-removal code amount stored at the specified address to the code-amount computing circuit 240.

More specifically, the truncation data supplied by the DMA 31 is stored in a register 231. The register 231 divides the truncation data into sub-band-specific data for storage, and outputs it to a selector 232 provided at the following stage. The selector 232 outputs truncation data to one of the signal input terminals of a multiplier 235 in order of sub-bands 3LL, 3HL, 3LH, 3HH, 2HL, 2LH, 2HH, 1HL, 1LH, and 1HH according to the selecting signal output from a sub-band selecting circuit 233. The remaining signal input terminal of the multiplier 235 receives the offset address $ADD_{OFF}$. The multiplier 235 supplies to one of the signal input terminals of an adder 236 a multiple of the offset address corresponding to the number of coding passes to be removed as specified by the truncation data in the sub-band selected by the selecting signal.

The sub-band selecting circuit 233 updates the selection signal for next sub-band selection in synchronization with a clock signal CLK supplied as a signal for requesting the updating of the selecting signal. The selecting signal output from the sub-band selecting circuit 233 is input also into a selector 234. The selector 234 supplies a starting address ADD (ADD3LL-ADD1HH) of a sub-band specified by the selecting signal to the remaining signal input terminal of the adder 236.

With the provision as described above, the adder 236 generates an address which stores the data indicative of a code amount remaining after a specified number of planes of coding-pass code data are removed in an ascending order with the lowest-order bitplane first where the specified number is the masking amount plus a number indicated by the truncation data of a sub-band selected by the selecting signal. The generated address is supplied to the memory C or the memory D.

Based on the post-removal code amount of each sub-band supplied from the memory C or the memory D, the code-amount computing circuit 240 computes a post-removal code amount with respect to all the sub-bands, and compares the computed code amount with the desired code amount. A signal indicative of a comparison result is supplied to a data-sequence-number switching circuit 250 provided at a subsequent stage.

One of the signal input terminals of an adder 241 receives the data indicative of a code amount retrieved from the memory C or the memory D by the code-amount computing circuit 240. The remaining signal input terminal of the adder 241 receives the output of a register 242, which stores the output of the adder 241. With this provision, the register 242 stores a total of code amounts of respective sub-bands as they are retrieved from the memory C or the memory D until a reset signal is input to the register 242.

One of the two signal input terminals of an AND gate 244 receives the selecting signal supplied from the sub-band selecting circuit 233 of the address generating circuit 230. The other signal input terminal of the AND gate 244 is connected to a register 243. The register 243 stores a selecting signal that is to be output during a time period after the sub-band selecting circuit 233 outputs the selecting signal indicating the sub-band 1HH (i.e., after outputting the selecting signals for all the sub-bands) and before the first sub-band 3LL is selected again. With this configuration, the AND gate 244 supplies a high-level enable signal to an enable terminal of a comparator 245 during the time period after the selecting signals are output for all the sub-bands and before the first sub-band 3LL is selected again, thereby enabling the comparator 245.

The comparator 245 compares the post-removal code amount supplied from the register 242 with the desired code amount, and a signal indicative of a comparison result to the data-sequence-number switching circuit 250 provided at the subsequent stage.

The data-sequence-number switching circuit 250 has the same construction as the data-sequence-number switching circuit 90 of the image compressing apparatus 100 of the first embodiment, and a description thereof will be omitted.

(3) THIRD EMBODIMENT

Figure 17:
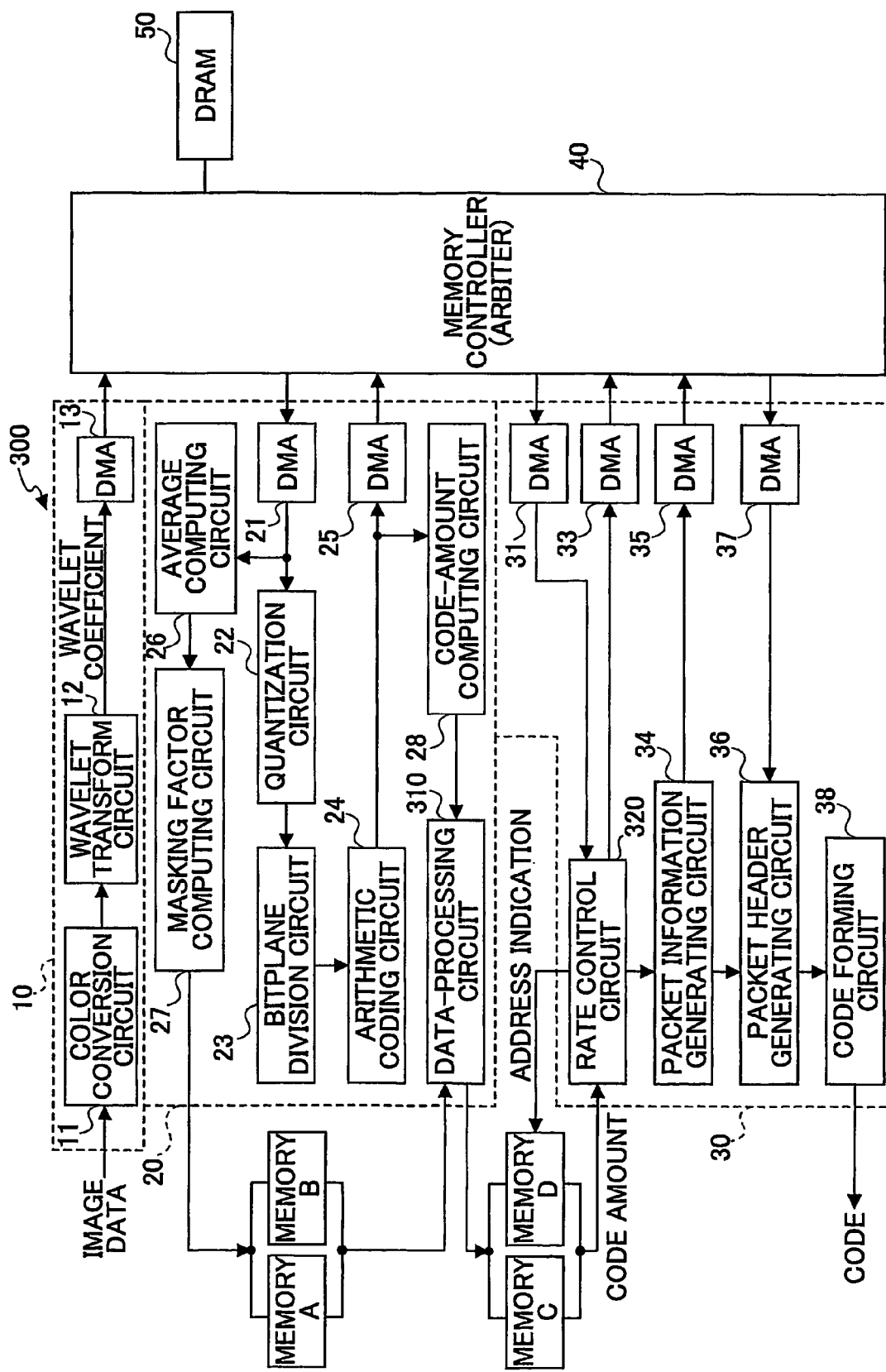
FIG. 17 is a block diagram showing the construction of an image compressing apparatus according to a third embodiment.

FIG. 17 is a block diagram showing the construction of an image compressing apparatus 300 according to a third embodiment. Like the image compressing apparatus 100 of the first embodiment, the image compressing apparatus 300 identifies optimum truncation data by comparing a code-data removal amount with a desired code removal amount. In doing so, the code-data removal amount is obtained in all the sub-bands based on a masking amount of each code-block of each sub-band and a code amount of each coding pass of each code-block when coding passes are removed plane by plane in each sub-band based on the truncation data.

In the image compressing apparatus 100 of the first embodiment, a code amount (a change in the code data amount) that is removed when coding-pass code data are removed plane by plane with the lowest-order bitplane first in code-blocks of each sub-band is stored in the memory C or the memory D. Then, the code-data removal amount for all the sub-bands is obtained. In the image compressing apparatus 300 of the third embodiment, on the other hand, the memory C and the memory D store a code-data removal amount for the removal of one plane of coding-pass code data with the lowest-order bitplane first in code-blocks of each sub-band, a code-data removal amount for the removal of two planes, ... and a code-data removal amount for the removal of 46 planes. Then, the code-data removal amount for all the sub-bands is obtained. Here, the code-data removal amount for the removal of two planes results from adding the code-data removal amount for the removal of the second plane of coding-pass code data to the code-data removal amount for the removal of the first plane of coding-pass code data.

The construction of the image compressing apparatus 300 of the third embodiment is basically the same as that of the image compressing apparatus 100 of the first embodiment (see FIG. 3). In the following, a description will be given of a data-processing circuit 310 and a rate control circuit 320, which differ from those of the image compressing apparatus 100. In the following description, the same elements as those of the image compressing apparatus 100 of the first embodiment are referred to by the same numerals.

Figure 18:
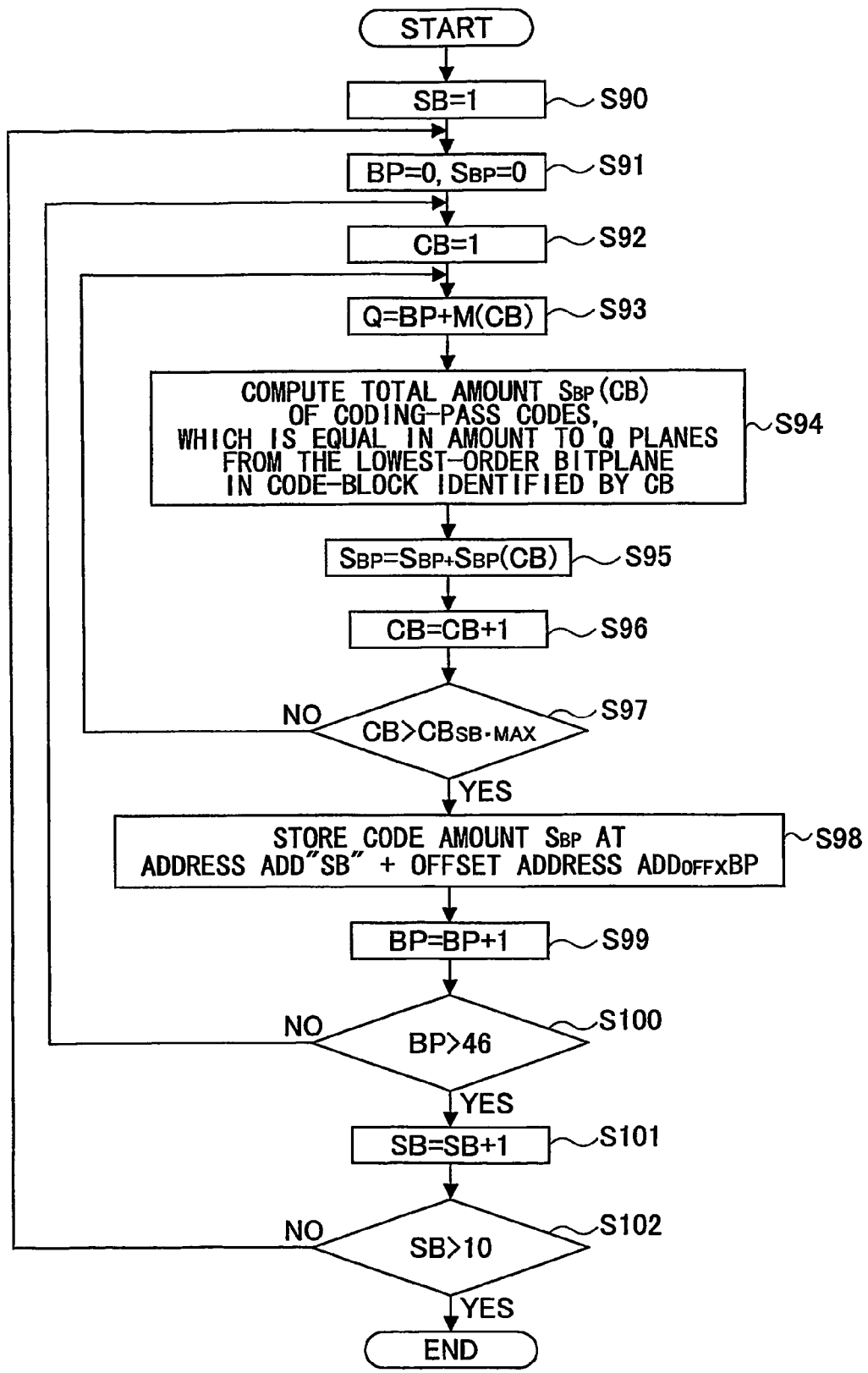
FIG. 18 is a flowchart showing the state transitions of a data-processing circuit of the image compressing apparatus of FIG. 17.

FIG. 18 is a flowchart showing the state transitions of the data-processing circuit 310 of the image compressing apparatus 300. The data-processing circuit 310 corresponds to the data-processing circuit 29 of the image compressing apparatus 100 of the first embodiment shown in FIG. 3. Such state transitions may be fed into a logic synthesizing tool made by the Synopsys corporation (U.S.), thereby automatically generating a specific circuit design. In the following, the state transitions will be described.

First, a sub-band identifier parameter SB is defined to identify individual sub-bands. Namely, SB=1 corresponds to 3LL, SB=2 to 3HL, SB=3 to 3LH, SB=4 to 3HH, SB=5 to 2HL, SB=6 to 2LH, SB=7 to 2HH, SB=8 to 1HL, SB=9 to 1LH, and SB=10 to 1HH.

The parameter SB is set to "1" (step S90). A parameter BP indicative of the number of coding-pass planes to be removed is set to "0", and a variable $S_{BP}$ is set to "0" (step S91) where the variable $S_{BP}$ indicates a total code-data removal amount that decreases as BP planes of coding-pass code data are removed successively with the lowest-order bitplane first in a current code-block. A parameter CB indicative of one of sequence numbers successively assigned to code-blocks in the sub-band identified by the parameter SB is set to "1" (step S92).

The masking amount M(CB) of a code-block identified by the parameter CB is added to the parameter BP, and a resulting value is set as a parameter Q indicative of the number of coding-pass planes that are to be removed in the identified code block (step S93). A total amount $S_{BP}(CB)$ of coding-pass code data is computed from data stored in the memory A or the memory B (step S94), which is equal in amount to the Q planes from the lowest-order bitplane in the code-block identified by the parameter CB. $S_{BP}(CB)$ is added to the variable $S_{BP}$ (step S95).

"1" is added to the parameter CB (step S96). If the parameter CB is below $CB_{SB\cdot MAX}$ that is the largest number assigned to a code-bock in a sub-band identified by the parameter SB (No at step S97), the procedure goes back to step S93. If the parameter CB is above $CB_{SB\cdot MAX}$ (Yes at step S97), $S_{BP}$ indicative of a code-data removal amount is stored at an address that is obtained by adding an offset address $ADD_{OFF} \times BP$ to an address ADD"SB" in a currently selected memory, which is either the memory C or the memory D alternately switched to an enable state in synchronization with each frame (step S98). The address ADD"SB" is an address ADD3LL if the parameter SB is 1, for example.

"1" is added to the parameter BP (step S99). If the parameter BP is 46 or smaller (No at step S100), the procedure returns to step S92 that was previously described. On the other hand, if the parameter BP exceeds 46, i.e., if the processing of all the 46 coding-pass planes is completed in the sub-band identified by the parameter SB (Yes at step S100), the parameter SB is incremented by "1" for processing of a next sub-band (step S101). If the parameter SB is equal to or smaller than 10 that is the largest number as previously defined (No at step S102), the procedure goes back to step S91. If the parameter SB exceeds 10 (Yes at step S102), it is ascertained that the processing of all the sub-bands is completed. With this, the procedure comes to an end.

It should be noted that the procedure based on the state transitions as described above may be implemented as software processing performed by a central processing unit. The flowchart in this case is the same as the one shown in FIG. 18.

FIG. 19 is a circuit diagram showing the construction of a rate control circuit 320 of the image compressing apparatus 300 of the third embodiment.

In FIG. 19, the same elements as those of the rate control circuit 220 of the image compressing apparatus 200 according to the second embodiment are referred to by the same numerals, and a description thereof will be omitted.

As shown in the figure, the rate control circuit 320 differs from the rate control circuit 220 of the image compressing apparatus 200 of the second embodiment only in a comparator 345 of a code-amount computing circuit 340. That is, the comparator 340 receives a desired code-data removal amount. The memory C or the memory D stores code-data removal amounts for the removal of one plane, two plane, and so on of coding-pass data in code-blocks of each sub-band, and the register 242 stores a total amount of the code-data removal amounts for respective sub-bands.

Further, the present invention is not limited to these embodiments, but various variations and modifications may be made without departing from the scope of the present invention.

The present application is based on Japanese priority application No. 2003-090792 filed on Mar. 28, 2003, with the Japanese Patent Office, the entire contents of which are hereby incorporated by reference.

The invention claimed is:

1. An apparatus for compressing an image, comprising:
 a coding unit configured to generate code data by encoding data derived from image data;

a memory unit which stores truncation data items identified by respective data sequence numbers, wherein a truncation data item specifies a way in which code data is removed from the generated code data, such that the larger the data sequence number, the larger an amount of code data removal, or such that the larger the data sequence number, the smaller the amount of code data removal; and a rate control unit configured to identify a data sequence number of a truncation data item that provides a code data parameter substantially equal to a desired value, said code data parameter being responsive to the amount of code data removal.

2. The apparatus as claimed in claim 1, wherein said rate control unit includes:

a computing unit configured to compute the code data parameter according to a truncation data item of a specified data sequence number; and a data-sequence-number switching unit configured to change the specified data sequence number in response to comparison of the computed code data parameter with the desired value, thereby identifying the data sequence number of the truncation data item that provides the code data parameter substantially equal to the desired value.

3. The apparatus as claimed in claim 2, wherein said coding unit generates the code data for respective units of processing, and the removal of code data according to a truncation data item is independent in each of the units of processing.

4. The apparatus as claimed in claim 3, wherein said code data parameter is equal to a total amount of code-data removal in all the units of processing, said apparatus further includes a data-processing unit configured to compute amounts of code-data removal in the respective units of processing and to store the computed amounts of code-data removal in memory, wherein said computing unit computes the code data parameter based on the computed amounts stored in the memory.

5. The apparatus as claimed in claim 4, wherein the generated code data in a given one of the units of processing is comprised of bitplanes, and said data-processing unit is further configured to compute amounts of code-data removal with respect to removal of respective bitplanes in the given one of the units of processing.

6. The apparatus as claimed in claim 4, wherein the generated code data in a given one of the units of processing is comprised of bitplanes, and said data-processing unit is further configured to compute amounts of code-data removal with respect to removal of respective numbers of bitplanes in the given one of the units of processing.

7. The apparatus as claimed in claim 3, wherein said code data parameter is equal to a total amount of code data remaining after the code-data removal in all the units of processing, said apparatus further includes a data-processing unit configured to compute amounts of code data remaining after the code-data removal in the respective units of processing and to store the computed amounts in memory, wherein said computing unit computes the code data parameter based on the computed amounts stored in the memory.

8. The apparatus as claimed in claim 7, wherein the generated code data in a given one of the units of processing is comprised of bitplanes, and said data-processing unit is further configured to compute amounts of remaining code data with respect to removal of respective numbers of bitplanes in the given one of the units of processing.

9. The apparatus as claimed in claim 1, wherein said coding unit performs two-dimensional discrete wavelet transform so as to generate the code data for respective sub-bands, the removal of code data according to a truncation data item being independent in each of the sub-bands and being directed to one or more bits on a side of a lowest-order bit in each of the sub-bands.

10. An apparatus for compressing an image, comprising:

a coding unit configured to generate code data by encoding data derived from image data;

a memory unit which stores truncation data items identified by respective data sequence numbers, wherein a truncation data item specifies a way in which code data is removed from the generated code data, such that the larger the data sequence number, the higher a quality of a reproduced image obtained by decoding the generated code data after the removal of code data, or such that the larger the data sequence number, the lower the quality of the reproduced image; and a rate control unit configured to identify a data sequence number of a truncation data item that provides a code data parameter substantially equal to a desired value, said code data parameter being responsive to an amount of code data removal.

* * * * *